United States Patent [19]
Nishii et al.

[11] Patent Number: 5,283,886
[45] Date of Patent: Feb. 1, 1994

[54] MULTIPROCESSOR CACHE SYSTEM HAVING THREE STATES FOR GENERATING INVALIDATING SIGNALS UPON WRITE ACCESSES

[75] Inventors: Osamu Nishii, Kokubunji; Kunio Uchiyama, Hachioji; Hirokazu Aoki, Hachioji; Kanji Oishi, Koganei; Jun Kitano, Tokorozawa; Susumu Hatano, Musashino, all of Japan

[73] Assignee: Hitachi, Ltd., Tokyo, Japan

[21] Appl. No.: 950,746

[22] Filed: Sep. 24, 1992

Related U.S. Application Data

[63] Continuation of Ser. No. 556,119, Jul. 20, 1990.

[30] Foreign Application Priority Data

Aug. 11, 1989 [JP] Japan .................................. 1-206773

[51] Int. Cl.$^5$ .............................................. G06F 12/12
[52] U.S. Cl. .............................. 395/425; 364/DIG. 1; 364/228.1; 364/229.2; 364/243; 364/243.41; 364/285
[58] Field of Search ................. 395/425, 325, 275, 575

[56] References Cited

U.S. PATENT DOCUMENTS

| | | | |
|---|---|---|---|
| 4,713,755 | 12/1987 | Worley, Jr. et al. | 364/200 |
| 4,843,542 | 7/1989 | Dashiell et al. | 395/325 |
| 4,939,641 | 7/1990 | Schwartz et al. | 364/200 |
| 4,959,777 | 9/1990 | Holman, Jr. | 364/200 |
| 4,979,099 | 12/1990 | Milia et al. | 395/325 |
| 5,058,006 | 10/1991 | Durdan et al. | 364/200 |

FOREIGN PATENT DOCUMENTS

| | | |
|---|---|---|
| 0301354 | 2/1989 | European Pat. Off. |
| 2430637 | 2/1980 | France |
| 52-14064 | 4/1977 | Japan |

OTHER PUBLICATIONS

Tehranian, Michael M. "Twin Cache Tags Enable Concurrent Micro/DMA Processing," Computer Design, vol. 24, No. 6, Jun. 1985, pp. 157-159.

J. Archibald and J. Baer, *Cache coherence protocols: Evaluation using a multiprocessor simulation model;* ACM Transactions on Computer Systems, vol. 4, No. 4, Nov. 1986, pp. 273-298.

A. J. Smith, *Cache memories;* Computering Surveys, vol. 14, No. 3, Sep. 1982, pp. 473-530.

*Primary Examiner*—Debra A. Chun
*Attorney, Agent, or Firm*—Fay, Sharpe, Beall, Fagan, Minnich & McKee

[57] ABSTRACT

Herein disclosed is a multiprocessor system which comprises first and second processors (1001 and 1002), first and second cache memories (100:#1 and #2), an address bus (123), a data bus (126), an invalidating signal line (PURGE:131) and a main memory (1004). The first and second cache memories are operated by the copy-back method. The state of the data of the first cache (100:#1) exists in one state selected from a group consisting of an invalid first state, a valid and non-updated second state and a valid and updated third state. The second cache (100:#2) is constructed like the first cache. When the write access of the first processor hits the first cache, the state of the data of the first cache is shifted from the second state to the third state, and the first cache outputs the address of the write hit and the invalidating signal to the address bus and the invalidating signal line, respectively. When the write access from the first processor misses the first cache, a data of one block is block-transferred from the main memory to the first cache, and the invalidating signal is outputted. After this, the first cache executes the write of the data in the transfer block. In case the first and second caches hold the data in the third state relating to the pertinent address when an address of an access request is fed to the address bus (123), the pertinent cache writes back the pertinent data in the main memory.

14 Claims, 9 Drawing Sheets

MULTIPROCESSOR CACHE SYSTEM HAVING THREE STATES FOR GENERATING INVALIDATING SIGNALS UPON WRITE ACCESSES

This is a continuation of copending application Ser. No. 07/556,119 filed on Jul. 20, 1990.

BACKGROUND OF THE INVENTION

1. Field of the Invention

The present invention relates to a multiprocessor system having a plurality of processors, a main memory and a plurality of cache memories.

2. Description of the Prior Art

The cache memory is discussed in detail on pp. 473 to 530 of "ACM, Computing Surveys", Vol. 14, No. 3.

The cache memory is one having a smaller capacity but capable of performing higher-speed accesses (i.e., read/write) than the main memory and is placed close to the processors with a view to speeding up their accesses.

Since the data transfer time period between the main memory and a processor is several times as long as that of the internal processing time period of the processor, the speed-up of the processing cannot be achieved if data is read out from the main memory upon each execution of an instruction. Also, the processor has the main memory in its entirety as its access target and will have its access concentrated in a restricted portion of the main memory for a very short time period. If, therefore, the data of the main memory is partially copied in the cache memory so that most of the accesses of the processor may be executed with the cache memory, the access time can be shortened on an average.

The cache memory manages its storage in the unit of a suitable size called the "block". Each block holds a copy of the data from a certain position of the main memory. This storage is called the "data array". In addition, which portion of the main memory each block corresponds to can naturally be dynamically changed, and this address data is stored in the cache memory. This storage is called the "address array".

In order that most of the accesses of the processor may be accomplished with the cache memory, the data frequently accessed recently should be stored in the cache whereas the data not accessed recently need not be stored in the cache. The cache memory performs the controls satisfying the requests thus far described, as will be explained with reference to the writing and reading operations as an example.

When the data in the cache is accessed, the block holding the data is continuously stored. When data outside of the cache is accessed, on the contrary, one block including the data in the main memory is transferred to the cache, and one block which has not been recently used is expelled from the cache. Here, it is called a "hit" when the accessed data is in the cache, and the otherwise situation is called a "miss".

The store method of the cache is divided into the write-through method and the copy-back method, as has been specified on pp. 473 to 530 of the aforementioned reference "ACM, Computing Surveys" Vol. 14, No. 3.

According to the former write-through method, if the cache is hit in case the processor is to write, the inside cache and the outside main memory have their contents coinciding at all times by performing the writing operations in both.

According to the latter copy-back method, on the contrary, if the cache is hit in case the processor is to write, the writing operation is carried out not in the outside main memory but only in the inside cache.

Comparing these two methods, the copy-back method is so more complex in the control than the write-through method that its control requests a larger amount of hardware. This request is serious especially in the control for holding the consistency of the content of each cache in the shared memory type multiprocessor.

Since, however, the main memory is not written when the cache is hit in the copy-back method, the write of the main memory can be omitted to provide an advantage in performance over the write-through method. Another advantage is that the traffic to the main memory can be reduced by avoiding the writing time to the main memory. This reduction in the traffic to the main memory is an important point for improving the total performance of the multiprocessor system.

Thus, in a multiprocessor system, the plural processors share the main memory and also have individual cache memories. In a case where the cache memories are missed, a write request or a read request is transmitted, if made from a processor, to the main memory through the missed cache memories. Therefore, it can be considered that the missed cache memories share the main memory for writing and reading operations.

In addition to the cache memories, there exists another device which is connected to a main memory bus and enabled to write to or read from the main memory directly. This device is exemplified by a video controller or a DMA (i.e., Direct Memory Access) controller for supporting a virtual memory. These devices for the direct read or write of the main memory will be generally called the "input/output device" in the present invention.

The multiprocessor system thus far described is equipped with a plurality of devices (e.g., a plurality of processors or a plurality of input/output devices) for reading or writing the main memory. Then, it is a natural requisite for the processor system to transfer the data from one device to another. In the system including the plural cache memories, however, the stored contents of the cache memories after the data transfer are not always correct. This is because a plurality of cache memories holding a certain address exist in the system but may have an inconsistency in data thereamong.

Two examples of this inconsistency will be explained with reference to the following. In the first example, the cache does not have its stored content updated, so if it stores the copy before the write, it fails to hold the consistency of data, although the main memory will have the latest content if it is written. This case is called the "first problem" of the data inconsistency.

The second example is directed to a problem which is raised when the data is written in the cache memory from the processor by the copy-back method. As has been described hereinbefore, the method of processing the writing access in the cache is roughly divided into the copy-back method and the write-through method. According to the write-through method, the main memory is always written, and the cache is written only in case it is hit. According to the copy-back method, only the cache is written, in case it is hit, and it is written after the block is replaced when missed. Thus, according to the copy-back method, the data is written only in the cache so that the stored content of the cache itself is the latest. However, the content of the main memory and the contents of other caches are not updated to fail to keep the consistency of the data. This case is called the "second problem" of the data inconsistency.

The aforementioned first problem of data inconsistency can be solved by a method based upon the concept of invalidation. If a block containing a write address exists in another cache, it is controlled so as to be eliminated and invalidated at each time of the write of the main memory, thus eliminating the inconsistency of the data, which has been described in connection with the first problem. This control is feasible in the system sharing a single main memory bus. Specifically, when a bus master on the main memory bus uses the main memory bus for the write, all the remaining caches watch the address of the main memory so that the block containing the write address may be invalidated if it exists in the pertinent cache. This invalidation is executed by changing a valid flag (which will be called the "V bit") of 1 bit, which is assigned to each block for indicating the validity of the same, from the logic "1" to the logic "0".

Now, a variety of solutions have been conceived in the prior art for the second problem. A representative method of the solutions is disclosed in Japanese Patent Publication No. 52-14064 claiming for its priority basis U.S. patent application Ser. No. 174,824 filed on Aug. 25, 1971. In this method, the data consistency is held by using the copy-back method, as schematically shown in FIG. 10. Reference numerals 201 and 202 designate processors; numerals 203 and 204 designate cache memories; numeral 205 designates a main memory; and numeral 206 designates a main memory bus. Each block of the caches 203 and 204 has as a MC bit (i.e., Multi-Copy bit indicating the existence of a plurality of copies) the information indicating whether or not an identical copy exists in another cache.

According to the copy-back method, therefore, only the cache is written. Upon this write, the identical copy, if any in another cache, is invalidated by sending the address to a broadcast bus 207 wired between the caches. If not in another cache, the sending of the address to the broadcast bus 207 is omitted. If, moreover, each block of the cache has a U bit (i.e., an update bit indicating the update of the data only in the cache), the U bit is set to the logic "1" upon the write of only the cache according to the copy-back method. Since the block of U=1 has inconsistency in data with the main memory, its data is written back in the main memory when the block is expelled in accordance with the block replacement and has the V bit and the U bit at the logic "1".

When, moreover, another bus master transfers the data, which belongs to the block having the V bit and the U bit at "1", from the main memory, a control is made to keep the old data of the main memory away from any access because the data of the pertinent block of the main memory is not the latest. Specifically, this access is interrupted, and one block including the inconsistency is newly written in the main memory to update the content of the main memory to the latest.

It should be noted that a signal line 208 for operating the MC bit of another cache is connected between the caches so as to enable the controls thus far described.

On pages 273 to 298, "ACM Transactions on Computer System" Vol. 4, No. 4, November, 1986, on the other hand, there are disclosed a variety of methods (of cache coherence protocol) for coincidences of the stored contents among a plurality of caches for executing the write in the shared bus multiprocessor system according to the copy-back method.

One method is called the "synapse method", which has a major feature that the main memory contains in connection with each cache block a single bit tag indicating whether or not it should respond to the miss of the block. In case the cache has an updated copy of the block, this bit informs the main memory of the fact that the response is unnecessary. Moreover, the cache block in the multiprocessor system is in one of invalid, valid (i.e., non-updated so that it may possibly be shared) and updated (i.e., dirty with no other copy) states.

In the multiprocessor system according to this synapse method, it is assumed that the write access from the first processor hits the first cache relating to the processor. At this write hit, the first cache is shifted from the valid state to the updated state. In the absence of the invalidating signal, moreover, the processing of the first cache is identical to that of the write miss, as will be described in the following.

In this synapse multiprocessor system, on the other hand, it is assumed that the write access from the first processor fails to hit the first cache relating to the processor. Upon this write miss, the data of the block is transferred like the read miss from the main memory to the first cache. If, at this transfer, a valid block copy is present in another cache connected to the shared bus, the cache is invalidated. By this writing operation, moreover, the first cache is loaded with the block to take the updated (i.e., dirty) state. Moreover, the block tag in the main memory is set so that the main memory ignores the subsequent request for the pertinent block. By the method thus far described, a coincidence of the stored content of the cache in the synapse multiprocessor system can be attained.

One method is called the "Berkeley method", which is majorly featured in that a direct cache-cache transfer is used, in case a block is shared between the caches, whereas an updated block is not written back into the main memory in case the updated block is shared between the caches. This method requests not only the three invalid, valid (i.e., non-updated and possibly shared) and updated (i.e., dirty) cache block states but also one shared and updated (i.e., shared-dirty and possibly shared) state.

In this Berkeley multiprocessor system, it is assumed that the write access from the first processor hits the first cache relating to the processor. Upon this write hit, the first cache is shifted from the valid to updated states. At this time, moreover, other caches connected to the shared bus are invalidated in response to the invalidating signal.

In this Berkeley multiprocessor system, on the other hand, it is assumed that the write access from the first processor fails to hit the first cache relating to the processor. Upon this write miss, the pertinent block is transferred directly to the first cache from the main memory or another cache in the updated (or dirty) state. Upon this transfer, the third cache having the pertinent copy is invalidated. By this writing operation, moreover, the first cache is loaded with the block to take the updated (or dirty) state. By the method thus far described, a coincidence of the stored content of the cache in the Berkeley multiprocessor system can be attained.

By the methods thus far described according to the prior art, the problems of the data coincidence of the caches of the multiprocessor system can be solved. If, however, the multiprocessor system is actually constructed in accordance with the concepts of the prior art, the following additional various problems will arise, as has been clarified by us.

In the first problem, as disclosed in Japanese Patent Publication No. 52-14064, it requests a complicated hardware that each cache block stores data concerning whether or not an identical copy exists in another cache. Let the case be considered, for example, in which the first cache reads and transfers a certain block from the main memory and in which the second cache then reads and transfers it from the main memory. Since, in this case, a plurality of copies are obtained at the time of the read and transfer of the second cache, the MC bits (i.e., Multi-Copy bits) of both the first and second caches have to be set at "1". The first cache can set the MC bit at "1", if it watches the read access on the main memory bus, but the second cache cannot determine the value of the MC bit by itself so that it has to operate the MC bit in response to a data from the first cache by using some data transmission means such as the MC bit operation line 208, for example, in FIG. 2. This needs the excessive hardware. Moreover, this operation is delayed because the signal has to go forward and backward between the caches. Therefore, the cache has to write the MC bits in itself at an exceptional timing which is delayed by a predetermined time from the start of the bus cycle. However, this exceptional timing is not always equal to that for storing the data which is read out from the main memory. This makes it difficult to design a high-speed system, and, if possible, a complex logic is requested for managing the timing.

A second problem is that, in the case of the write hit of the first cache in the well-known synapse multiprocessor system, the block, which ordinarily needs no transfer, is transferred from the main memory to the first cache because of the hit. For this data transfer, the main memory has to be subjected to the read access. Since, however, the main memory having a large capacity generally takes a long access time, the data transfer is difficult to speed up.

A third problem arises in the known synapse multiprocessor system and is directed to a troublesomeness that the single bit tag indicating whether or not the main memory should respond to the miss of the block has to be not only contained in the main memory in connection with each cache block but also controlled in response to the shift of the state of the cache.

A fourth problem arises in the known Berkeley multiprocessor system and is that, since the caches have as many as four states, the hardware of a cache state control unit for controlling the states of a cache in response to the access from the processor and the address from the shared main memory bus is large-sized to have its logic complicated.

A fifth problem also arises in the known Berkeley multiprocessor system and is that, if the number of multiprocessors and the corresponding number of caches are increased, the data of the updating state of a cache being updated (or dirty) has to be transferred to other caches one by one to thereby stop the access during the transfer from the pertinent processor to the cache which is stored with the data in the updated state to restore the updated (or dirty) state. If the read access from the first processor fails to hit the first cache, for example, the pertinent block is transferred from the second cache in the updated (or dirty) state directly to the first cache. As a result, the first cache is shifted from the invalid to valid states, and the second cache is shifted from the updated to shared-dirty states. Next, in case the read access from the third processor fails to hit the third cache, the pertinent block is transferred from the second cache in the shared-dirty state directly to the third cache. As a result, the third cache is shifted from the invalid to valid states, and the second cache keeps the shared-dirty state. In case, moreover, the read access from the N-th processor fails to hit the N-th cache, similar results come out so that the access from the second processor to the second cache is continuously interrupted during those continuous direct transfers.

Another problem is an elongation of the wait time to the main memory in case another bus master (e.g., another cache or input/output device) requests the use of the bus during a block transfer relating to the data coincidence. This obstructs the soft movement of the bus ownership on the main memory. In Japanese patent Publication No. 52-14064, for example, when the write access misses the first cache, the data corresponding to the address of the write access is invalidated at first if it belongs to one block of another cache. Next, said one block is transferred (i.e., block-transferred) from the main memory to the first cache, and this first cache then writes the data of the write access on the block-transferred data. Since, on the other hand, the block-transferred one block is composed of a plurality of (e.g., four) words, its transfer from the main memory to the first cache requests a plurality of bus accesses. Therefore, the first cache writes the data of the write access on the data of the block-transferred first word. If, on the other hand, another bus master, i.e., the second cache or the input/output device tries to access the main memory during the plural accesses at the block transfer, the access from the second cache may not be accepted. This is because another bus master may have requested the block data just being block-transferred from the main memory by the first cache. However, after the transfer of the first word of the one block block-transferred to the first cache having caused the write miss, the state of the first cache has already been shifted from the invalid to updated states. Therefore, the data of the block data to be block-transferred from the main memory is not wholly prepared in the first cache having been shifted to the updated state so that the one block of complete words cannot be written back from the first cache to the main memory. In case, therefore, during the block transfer of the first cache having being write-missed, another bus master accesses the data of any block being in the updated state in the first cache, the access of another bus master to the pertinent block is always made to wait till the end of the block transfer from the main memory to the first cache. Thus, in the well-known prior art before the present invention, there is not any device that will relinquish the bus ownership of the main memory bus to another bus master during a plurality of times of main memory bus accesses of the block transfer but will not cause any increase in the aforementioned wait time to the main memory.

The present invention has been conceived on the aforementioned investigation results obtained by us and contemplates to provide a multiprocessor system capable of eliminating at least some of the aforementioned problems owned by the prior art.

BRIEF SUMMARY OF THE INVENTION

An object of the present invention is to provide a multiprocessor which need not contain in each of a plurality of caches an exceptional bit data indicating that the data of an identical copy is stored in the caches.

Another object of the present invention is to provide a multiprocessor system which need not transfer the data of a hit block from the main memory to the caches at the time of the write hit of the caches on the valid and non-updated block.

Still another object of the present invention is to provide a multiprocessor system which need not contain in the main memory an exceptional bit data indicating whether or not the main memory should respond to the block miss.

A further object of the present invention is to provide a multiprocessor system which can reduce the number of cache states to the minimum necessary for the cache coherence in the multiprocessors and can avoid the large size of the hardware of the control unit for controlling the cache states.

A further object of the present invention is to provide a multiprocessor which can respond not only to the request of the data transfer sequentially from the cache in the updated (or dirty) state to other plural caches but also promptly to the access request from the pertinent processor.

According to one preferred mode of embodiment of the present invention, the bus ownership of the shared main memory bus is relinquished to another bus master during a plurality of times of main memory bus accesses of the block transfer from the main memory to a cache at the time of the miss of said cache, and the wait time to the main memory can be suppressed to a small value.

In order to make it possible to achieve at least several of the aforementioned various objects, a multiprocessor according to a representative embodiment of the present invention comprises:

a first processor (1001) for generating an address;

a first cache memory (100:#1), FIG. 1 adapted to be accessed in accordance with said address from said first processor (1001);

a second processor (1002) for generating an address;

a second cache memory (100:#2) adapted to be accessed in accordance with said address from said second processor (1002);

an address bus (123) to which are transmitted said address coming from said first processor (1001) through said first cache memory (100:#1) and said address coming from said second processor (1002) through said second cache memory (100:#2);

a data bus (126) connected to said first processor (1001) through said first cache memory (100:#1) and to said second processor (1002) through said second cache memory (100:#2) (22);

an invalidating signal line (PURGE:131) connected to said first cache memory (100:#1) and said second cache memory (100:#2); and memory means (1004) connected to said address bus (123) and said data bus (126), wherein said first cache memory (100:#1) and said second cache memory (100:#2) are operated by at least the copy-back method, wherein the state of the data of said first cache memory (100:#1) exists in one state selected from a group consisting of: a first state corresponding to the invalid state of the pertinent data in said cache memory; a second state corresponding to the valid and non-updated state of the pertinent data in said cache memory; and a third state corresponding to the valid and updated state of the pertinent data in said cache memory, wherein the state of the data of said second cache memory (100:#2) exists in one state selected from said group;

wherein, when the write access from said first processor (1001) hits said first cache memory (100:#1), the state of the data of said first cache memory (100:#1) is shifted from said valid and non-updated second state to said valid and updated third state, and said first cache memory (100:#1) outputs said write hit address and an invalidating signal to said address bus (123) and said invalidating signal line (PURGE:131);

wherein, when the write access from said second processor (1002) hits said second cache memory (100:#2), the state of the data of said second cache memory (100:#2) is shifted from said valid and non-updated second state to said valid and updated third state, and said second cache memory (100:#2) outputs said write hit address and an invalidating signal to said address bus (123) and said invalidating signal line (PURGE:131);

wherein, when the write access from said first processor (1001) misses said first cache memory (100:#1), said first cache memory (100:#1) outputs the address of said write miss to said address bus (123) to block-read the data of one block from said memory means (1004) and outputs the invalidating signal to said invalidating signal line (PURGE:131) and then executes the write of the data relating to said write miss to said block-read one block, wherein, when the write access from said second processor (1002) misses said second cache memory (100:#2), said second cache memory (100:#2) outputs the address of said write miss to said address bus (123) to block-read the data of one block from said memory means (1004) and outputs the invalidating signal to said invalidating signal line (PURGE:131) and then executes the write of the data relating to said write miss to said block-read one block, and wherein, in case one of said first cache memory (100:#1) and said second cache memory (100:#2) holds data of the valid and updated third state relating to an address when said address bus (123) is fed with the address of access request relating to the read or write, said cache writes back said data to said memory means (1004) and shifts said data relating to said address from said third state to the valid and non-updated second state.

The multiprocessor system thus constructed executes the operations relating to the cache coherence in the following manner.

In the multiprocessor system, first of all, the cache coherence is broken if the data in the valid and non-updated second state and the data in the valid and updated third state in connection with the common address simultaneously exist. However, if one of the first and second caches comes into the valid and updated third state, the cache coherence can be kept by bringing the other cache into the invalid first state.

As a result, when the write access from the first processor (1001) hits the first cache memory (100:#1), the state of the data of the first cache memory (100:#1) is shifted from the valid and non-updated second state to the valid and updated third state, and the first cache memory (100:#1) outputs the write hit address and the invalidating signal to the aforementioned address bus (123) and invalidating signal line (PURGE:131), respectively. In case, therefore, the second cache memory (100:#2) stores the data of the valid and non-updated second state relating to that address, the cache coherence is kept because the data in the second state is shifted to the invalid first state. The cache coherence is also kept likewise when the write access from the second processor (1002) hits the second cache memory (100:#2). As a result, upon the write hit of the cache, the write hit address and the invalidating signal are outputted to the shared memory bus, but the block transfer from the memory means (1004) is not executed.

When, moreover, the write access from the first processor (1001) misses the first cache memory (100:#1), this first cache memory (100:#1) outputs the write miss address to the address bus (123) to block-read the data of one block from the memory means (1004) and outputs the invalidating signal to the invalidating signal line (PURGE:131). After this, the aforementioned first cache memory (100:#1) executes the write of the data relating to the write miss to the block-read one block. As a result, upon the write of the data relating to the write miss, the first cache memory (100:#1) is shifted from the invalid first state to the valid and updated third state, and the second cache memory (100:#2) is shifted from the invalid and non-updated second state to the valid first state so that the cache coherence is kept. When, on the other hand, the write access from the second processor (1002) misses the second cache memory (100:#2), the cache coherence is also kept likewise.

In case one of the first cache memory (100:#2) and the second cache memory (100:#2) (excepting the cache memory, if any, issuing an access request) holds the data of the valid and updated third state relating to the address of an access when the address bus (123) is fed with the address of the access request relating to the read or write, said cache writes back said data in the memory means (1004). As a result, the first cache memory (100:#1) and the second cache memory (100:#2) can realize the copy-back of the data of the valid and updated third state in the copy-back method to the memory means (1004).

On the other hand, the identification of the first state, in which the data of the cache memory is invalid, the valid and non-updated second state and the valid and updated third state within the cache is sufficed by using a valid bit (i.e., V bit) indicating the invalidity and validity and the update bit (i.e., U bit) indicating the non-update and update so that the exceptional bit data indicating the storage of the data of the common copy among a plurality of caches need not be contained in the individual caches. Moreover, the number of states of the caches can be restricted to the minimum number 3 for the cache coherence of the multiprocessor system.

Upon the read miss of the cache, moreover, the block in the valid and updated third state is transferred from another cache to the memory means (1004) and then from the memory means (1004) to the cache having caused said read miss. Upon the write miss of the cache, on the other hand, the block in the valid and updated third state is transferred from another cache to the memory means (1004) and then from the memory means (1004) to the cache having caused said write miss. As a result, an exceptional bit data indicating whether or not the memory means (1004) should respond to the miss of the cache of the block need not be contained in the memory means (1004).

If the block of the cache in the valid and updated third state is requested for the access in case the numbers of processors and caches are increased, the block of the cache in the third state is written back from the pertinent cache to the memory means (1004), and the pertinent cache is shifted from the third state to the valid and non-updated second state. As a result, after the cache at first in the valid and updated third state has been shifted to the valid second state, this cache will not respond to sequential data transfer requests from other plural caches, and the response is vicariously accomplished by the memory means (1004). Thus, the cache at first in the valid and updated third state can promptly respond to the access request from the pertinent processor.

Other objects and features of the present invention will become apparent from the description to be made in connection with the embodiments of the invention.

DESCRIPTION OF THE PREFERRED EMBODIMENTS

Summary of the Structure of Multiprocessor System

Figure 1:
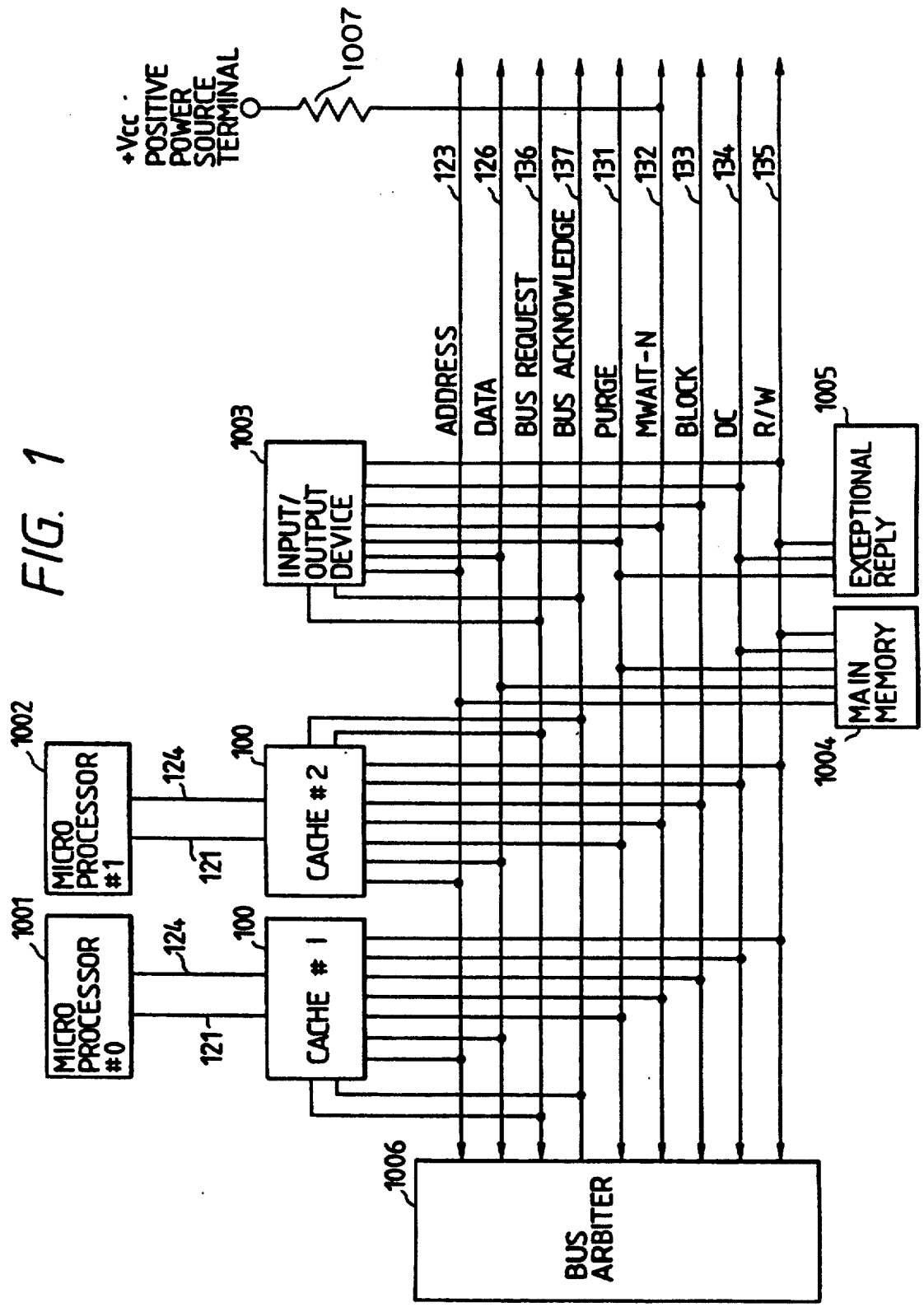
FIG. 1 is a diagram showing the whole structure of a multiprocessor system according to one embodiment of the present invention.

FIG. 1 is a diagram showing the whole structure of the multiprocessor system according to one embodiment of the present invention.

Reference numerals 1001 and 1002 designate microprocessors (or microprocessor units) which have cache memories 100 (#1 and #2), respectively. The first processor 1001 and the first cache 100 (#1) are connected through a processor address line 121 and a processor data line 124, and the second processor 1002 and the second cache 100 (#2) are likewise connected through a processor address line 121 and a processor data line 124.

Numeral 1003 designates an input/output device; numeral 1004 a main memory; numeral 1005 an exceptional reply control circuit; and numeral 1006 a bus arbiter. All the accesses from the multiprocessors 1001 and 1002 or the input/output device to the main memory 1004 are accomplished through a main memory bus.

This main memory bus includes an address line 123, a data line 126, an invalidating signal line 131 (PURGE signal), a main memory wait signal line (MWAIT-N signal) 132, a block transfer signal 133 (BLOCK signal), a data transfer completion signal 134 (DC signal), a read-write identification signal 135 (R/W signal), and other ordinary bus control signals (e.g., a bus request signal line 136 or a bus acknowledge signal line 137).

The main memory 1004 is accessed, except under the conditions when the write access (R/W signal 135=write) and the invalidating cycle (PURGE signal 131=1), to return the DC signal 134 in accordance with the access rate of the main memory element. When in the write access (R/W signal 135=write) and in the invalidating cycle (PURGE signal 131=1), the exceptional replay control circuit 1005 returns the DC signal 135. In this case, the time period for returning the DC may be sufficient for invalidations in the cache memory so that the accesses can be completed earlier than the access time of the main memory element.

The MWAIT-N signal 132 of each cache 100 (#1 or #2) is produced by an open drain type output circuit and is connected through a resistor 1007 to a positive power terminal +Vcc. In case a plurality of open drain output terminals are connected, the main memory wait signal line 132 takes an L (low) level if the output of any of the open drain output terminals is at the L level. As a result, the MWAIT-N signal 132 of each cache 100 (#1 or #2) and the input/output device 1003 is the sum of the negative logics of the NWAIT-N signals 132 of all the caches.

Moreover, the first cache memory (100:#1) and the second cache memory (100:#2) operate at least according to the copy-back method. For an exceptional data requested to have a high reliability, on the other hand, the first cache memory (100:#1) and the second cache memory (100:#2) operate according to the write-through method. As a result, the exceptional data requested to have the high reliability is always written not only in the caches but also in the main memory 1004 generally having the ECC (i.e., error correction codes) added thereto, so that it can be avoided from being broken in the main memory 1004 even if the caches should experience a malfunction such as a soft-error.

On the other hand, the state of the data of the first cache memory (100:#1) exists in one state selected from a group consisting of: a first state corresponding to the invalid state of the pertinent data in said cache memory; a second state corresponding to the valid and non-updated of the pertinent data in said cache memory; and a third state corresponding to the valid and updated state of the pertinent data in said cache memory. Since, moreover, the first cache memory (100:#1) and the second cache memory (100:#2) are made to have absolutely identical internal structures and operations, the possible number of the states of the data of the second cache memory (100:#2) is equal to that of the data of the first cache memory (100:#1).

If the data of the first cache memory (100:#1) is in the valid and non-updated second state when the write access from the first processor (1001) hits the first cache memory (100:#1), then the data state of the first cache memory (100:#1) is shifted to the valid and updated third state, and the first cache memory (100:#1) outputs the write hit address and the invalidating signal to the address bus (123) and the invalidating signal line (PURGE:131), respectively.

If the state of the second cache memory (100:#2) is in the valid and non-updated second state when the write access from the second processor (1002) hits the second cache memory (100:#2), then the data state of the second cache memory (100:#2) is shifted to the valid and updated third state, and the second cache memory (100:#2) outputs the write address hit address and the invalidating signal to the address bus (123) and the invalidating signal line (PURGE:131), respectively.

When the write access from the first processor (1001) misses the first cache memory (100:#1), the first cache memory (100:#1) outputs both the write miss address to the address bus (123) to block-read the data of one block from the main memory (1004) and the invalidating signal to the invalidating signal line (PURGE:131) and then executes the write of the data relating to the write miss to the block-read one block.

When the write access from the second processor (1002) misses the second cache memory (100:#2), the second cache memory (100:#2) outputs both the write miss address to the address bus (123) to block-read the data of one block from the main memory (1004) and the invalidating signal to the invalidating signal line (PURGE:131) and then executes the write of the data relating to the write miss to the block-read one block.

If one of the first cache memory (100:#1) and the second cache memory (100:#2) holds the data in the valid and updated third state relating to the address of the access request relating to the read or write when the address bus (123) is fed with said address, said cache writes back said data in the main memory (1004) and shifts the data relating to the access request address from the third state to the valid and non-updated second state.

Summary of the Internal Structure of Cache Memory

Figure 2:
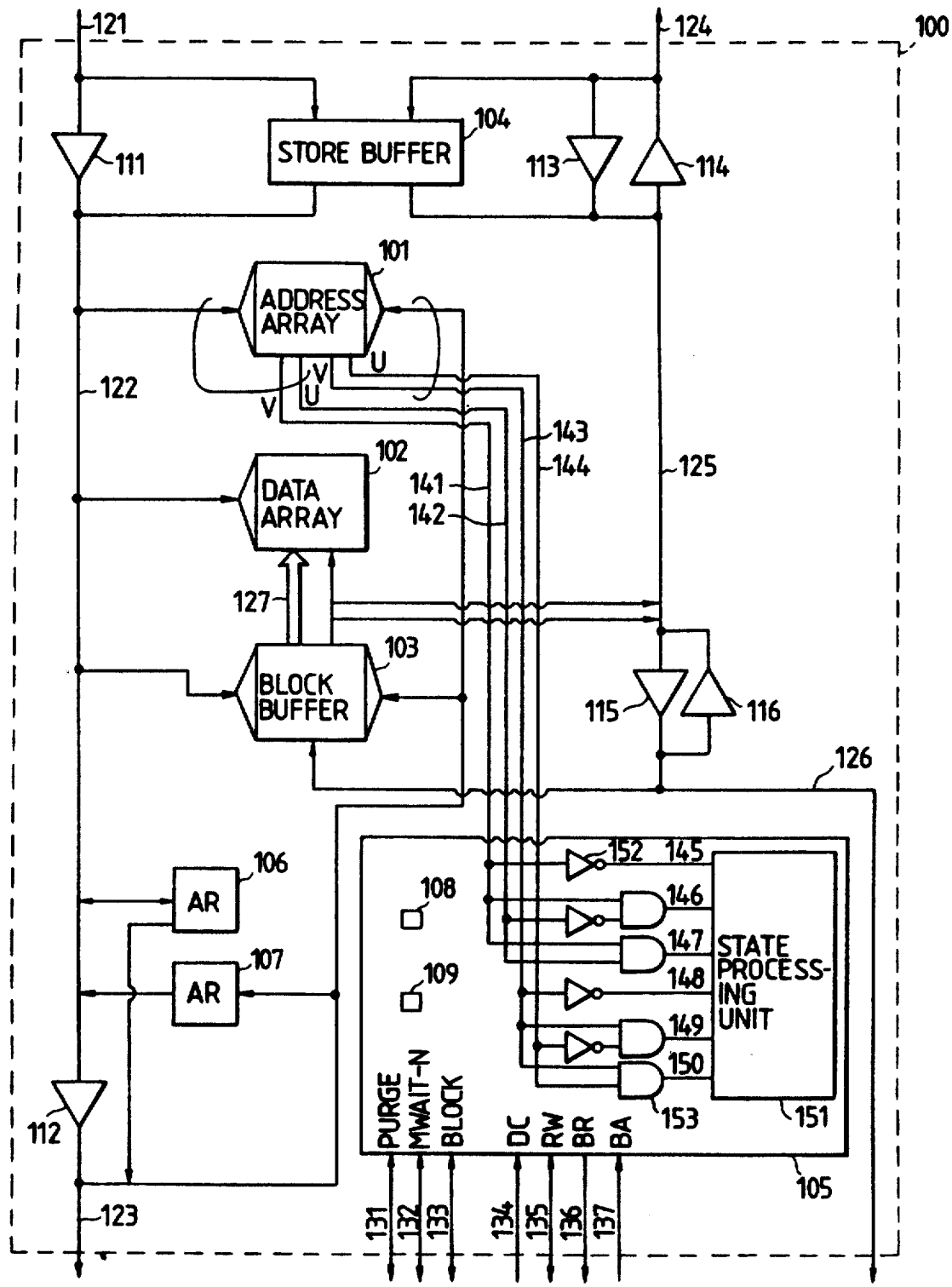
FIG. 2 is a diagram showing the internal structure of a cache memory to be used in the multiprocessor system of FIG. 1.

FIG. 2 shows the internal structure of the cache 100 (#1 or #2) used in the multiprocessor system of FIG. 1.

The circuit enclosed by the broken lines 100 of this cache is integrated as a semiconductor VLSI of one semiconductor chip.

The cache 100 (#1 or #2) can be connected through the processor address line 121 and the processor data line 124 to the processor 1001 or 1002, and through the main memory address line 123, the main memory data line 126, the invalidating signal line 131 (PURGE signal), the main memory wait signal line (MWAIT-N signal) 132, the block transfer signal 133 (Block signal), the data transfer completion signal 134 (DC signal), the read/write identification signal 135 (R/W signal), the bus request signal line 136 (BR signal) and the bus acknowledge signal line 137 (BA signal) to the main memory bus, another cache, the input/output device 1003 and the exceptional reply control device 1005.

Moreover, the cache 100 is composed of an address array 101, a data array 102, a block buffer 103, a store buffer 104, a cache control circuit 105, a block transfer address register 106, a main memory watch address register 107, address line switch circuits 111 and 112, data line switch circuits 113, 114, 115 and 116, an internal address line 122, an internal data line 125 and so on.

Moreover, the cache 100 can process an address of 32 bits and data of 32 bits from the processor. The address lines 121, 122 and 123 are composed of address lines having a width of 30 bits for feeding 30 bits of an upper address, and byte control lines having a width of 4 bits for feeding 2 bits of a lower address in the decoded form, and the data lines 124 to 126 have a width of 32 Bits. Incidentally, a data of 16 bytes can be transferred at one time through the data bus 127 from the block buffer 103 to the data array 102.

The address array 101 stores the address data corresponding to the data stored in a cache and the data relating to the validity and update of the stored data. On the other hand, the data array 102 stores the data corresponding to the address data stored in the address array 101. Incidentally, the address array 101 and the data array 102 take the set associative having mapping 4 ways in the present embodiment.

Detailed Description of Address Array 101

Figure 3:
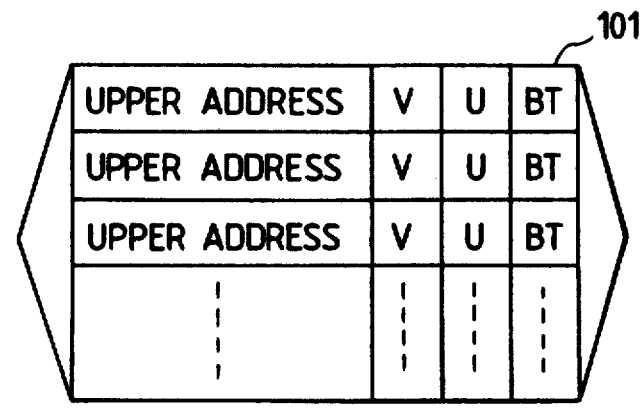
FIG. 3 is a diagram showing the internal structure of an address array 101 in the cache memory of FIG. 2.

The internal structure of the address array 101 is shown in FIG. 3. One row of the address array 101 is composed of the tag (i.e., the upper address memory unit for indicating what position the data is copied from); a valid bit (i.e., V bit) indicating that the data are valid; an update bit (i.e., Ubit) indicating that the data is updated only in the cache; and a block transfer bit (i.e., BT bit) indicating that the data is being block-transferred between the cache and the main memory. Moreover, four rows are selected by a lower address.

As shown in FIG. 2, the address array 101 is constructed of a two-port RAM. As a result, the tag address, V bit, U bit and BT bit of the address array 101 can be simultaneously searched for the two inputs of the internal address 122 by the access from the processor and the main memory address 123 by the access to the main memory bus.

As has already been described, the state of the data of the cache 100 of the present invention can be realized totally with three states: the invalid first state (V="0"); the valid and non-updated second state (V="1" and U="0"); and the valid and updated third state (V="1" and U="1"). Moreover, the BT bit of the block being block-transferred can be set at "1". In other words, BT="1" at the start of the block transfer, and BT="0" at the end of the block transfer. When the processor requests a data of a cache, it is generally called a "hit" when the requested data exists in said cache, but otherwise a "miss". The hit or miss is executed by feeding the access address to the address array 101 to search the address array 101. The hit is made if the following two conditions are satisfied: that the tag address (i.e., the upper address (i.e., the upper address) coincides with the upper address of the search address in any of the four rows of information read out from the address array 101 in accordance with the lower bit of the search address; and that the V bit is at "1".

Then, the address array 101 selects one row for the search of the internal address 122 accessed from the processor, and outputs the values of the V bit and the U bit of the row to signal lines 141 and 142, respectively. The row is selected as the following method. When the access hits, the hit row is selected. When the access misses, the row which is expelled for the block replacement (i.e., a row which coincided with the lower address of the search address but failed with the upper address of the search address) is selected.

Then, the state of the block selected is determined in the control circuit 105 and is fed to a state processing unit 151. The symbol of a gate 152 indicates an inverter for outputting the inverted value of an input signal. The symbol of a gate 153 indicates an AND gate for outputting the logical product of input values. Therefore, a signal line 145 indicates that the block accessed by the processor is in the invalid first state (V="0"). A signal line 146 indicates that the block accessed by the processor is in the valid and non-updated second state (V="1" and U="0"). A signal line 147 indicates that the block accessed by the processor is in the valid and updated third state (V="1" and U="1"). The state processing unit 151 is connected with the signal lines 145, 146 and 147 so that it can know the state of the hit block at the hit time and the state of the block expelled for the block replacement at the miss time.

For the search by the internal address 122 and by the access address 123 to the main memory, the operations to be executed are similar to those for the search by the access address from the processor, as has been described hereinbefore. Specifically, the V bit and U bit selected in accordance with the searches of the main memory by the access address 123 are outputted to signal lines 143 and 144, respectively. In response to the V bit and U bit of the signal lines 143 and 144, the inverter and AND gate in the control circuit 105 send the detected signals in the invalid first state, in the valid and non-updated second state and in the valid and updated third state through signal lines 148, 149 and 150, respectively, to the state processing unit 151.

Operations of Block Buffer 103

The block buffer 103 has an ability of holding the block-transfer data of one block (i.e., four words) temporarily at the time of the block transfer from the main memory to the cache memory. Moreover, the block buffer 103 is constructed of a two-port RAM so that it can feed a data of different address to the processor simultaneously as it receives a data from the main memory.

At the time of the write access from the processor to the cache or the main memory, on the other hand, the block buffer 103 takes no part in that access.

Operations of Store Buffer 104

At the time of the write access from the processor to the cache or the main memory, the store buffer 104 buffers not only the write address (121) and the byte control from the processor in accordance with the FIFO (First in First out) sequence but also the write data from the processor in accordance with the FIFO (First in First out) sequence.

When, however, the processor requests the read of any data in the store buffer 104, the data can be promptly fed to the processor independently of the FIFO sequence. When, on the other hand, the processor requests the write of the data of the same address as any address in the store buffer 104, the data can be promptly written independently of the FIFO sequence in a position having the same address in the store buffer 104.

As has been described hereinbefore, the address (121) and data (124) to be written from the processor are once buffered in and then read out from the store buffer 104.

In an exceptional case (e.g., when a memory unit (e.g., a unit for storing a data relating to the operation of the input/output device, such as a control register or a status register) of a memory mapped (i.e., assigned to the address of the address space of the main memory) input/output device is accessed, when the data for processor-processor communications for supporting the read modify write of the main memory is to be accessed, or when an access caused by an interrupt request signal to the processor is transferred to the cache), then all the processes for processing all the data buffered by the store buffer 104 to the address array 101, the data array 102 or the main memory are completed. After this, with the cache memory being passed, i.e., with the switch circuits 111, 112, 113 (or 114) and 115 (or 116) being logically conducting, the data is transmitted from the processor to the main memory bus (or vice versa).

As has been described hereinbefore, the store buffer 104 is different from the address array 101 and the data array 102 in that the data is temporarily stored so that it may be buffered. Since the write access by the processor, the processing of the inside of the cache and the processing between the cache and the main memory are executed in parallel by buffering the address and the data in the store buffer 104, the wait and delay of the write access to the cache can be drastically reduced. Incidentally, the data stored in the store buffer 104 is excluded from the target of the data coherency control. This is because the store buffer 104 stores the address and data temporarily, and the data transmission and reception between the processors are not executed without their preliminary communications so that all the write address and data prior to the preliminary communications are already processed (or written back) from the store buffer 104 to the address array 101, the data array 102 or the main memory.

On the contrary, the data stored in the block buffer 103 has to be included in the target of the data coherency control at the time of the access to the main memory bus. For this necessity, the data of the block buffer 103 has to be invalidated, if necessary, by the way the tag portion of the address of the block buffer 103 is always the tag portion of the address of the address array 101 so that the invalidation can be realized by setting the V bit corresponding to the tag of the address array 103 to "0".

Operations of Cache Control Circuit 105

The cache control circuit 105 manages the control sequence in the cache memory.

Between this control circuit 105 and the main memory bus, there are connected the invalidating signal line 131 (for the PURGE signal), the main memory wait signal line 132 (for the MWAIT-N signal), the block transfer signal line 133 (for the BLOCK signal), the bus cycle completion signal line 134 (for the DC signal), the read/write signal line 135 (for the R/W signal), the bus request signal line 136 (for the BR signal) and the bus acknowledge signal line 137 (for the BA signal).

When another cache is to be invalidated, the control circuit 105 asserts the PURGE signal 131 to the level "1". In case the access from the processor to the cache is the write hit or the write miss, the cache asserts the PURGE signal 131 to the level "1". Upon reception of the PURGE signal 131 asserted from another cache, on the contrary, the control circuit 105 starts preparations for invalidations for setting the V bit of a row, in which the address 123 of the main memory bus hits the address array 101, to "0".

The MWAIT-N signal 132 is an interrupt signal for the negative logical signal assert which is provided for interrupting the data transfer between the main memory and another cache. If, on the contrary, the MWAIT-N signal 132 is asserted by another bus master, then the access of the cache having received the MWAIT-N signal to the main memory is interrupted. However, the assert of the negative logical signal corresponds to the L (low) level of the electric signal. At the time of the read miss or the write miss, for example, the first cache requests the read access to the main memory for the block transfer. In case the block in the valid and updated third state is stored by the second cache in connection with the address of that read access, this second cache causes the first cache to wait for the access to the main memory by asserting the MWAIT-N signal 132. During this wait, the second cache writes back to the main memory the block in the valid and updated third state by the block transfer. After the end of this block transfer, the second cache negates the MWAIT-N signal 132 to release the access wait of the first cache for the main memory. Thus, the first cache can acquire the update data of the second cache through the main memory.

The BLOCK signal 133 is asserted by the cache requesting the cache transfer for transferring the data of one block continuously from the cache to the main memory or vice versa. The fact that the second cache is executing the block transfer between itself and the main memory can be grasped from the first cache by watching the level of that block signal 133.

The DC signal 134 is informed to the cache at the end of the memory bus cycle by another bus master so that the informed cache can know the accessibility to the main memory.

The R/W signal 135 is a signal for identifying whether the access through the cache from the processor to the main memory is the read access or the write access. Moreover, the cache can know whether the access to the main memory by another bus master is the read access or the write access.

The BR signal 136 is a bus request signal which is sent from the bus master to the bus arbiter so as to acquire the bus ownership of the main memory bus.

The BA signal 137 is a bus acknowledge signal which is to be asserted by the bus arbiter when the bus arbiter gives the bus ownership to the bus master having generated the bus request signal (i.e., the BR signal).

The cache control circuit 105 is enabled to select whether or not an invalidation bus cycle, as will be described hereinafter, is to be issued (i.e., the address of the write hit and the invalidating signal are to be outputted from the cache to the main memory bus at the time of the write hit to said cache). This setting is executed by a one-bit register 108 in the control circuit 105. When the register 108 takes the value "1", this is called the invalidation bus cycle selection mode, and then this invalidation bus cycle is executed. When the register 108 takes the value "0", the invalidation bus cycle is wholly omitted. If the system is one in which another bus master does not access the address to be cache-stored by the copy-back method (i.e., the system in which access areas of two caches for the write by the copy-back method are different from each other), there arises no trouble in connection with the data coherency if the invalidation bus cycle is omitted, so that the processing efficiency can be enhanced to an extent omitting the invalidation bus cycle.

Figure 6:
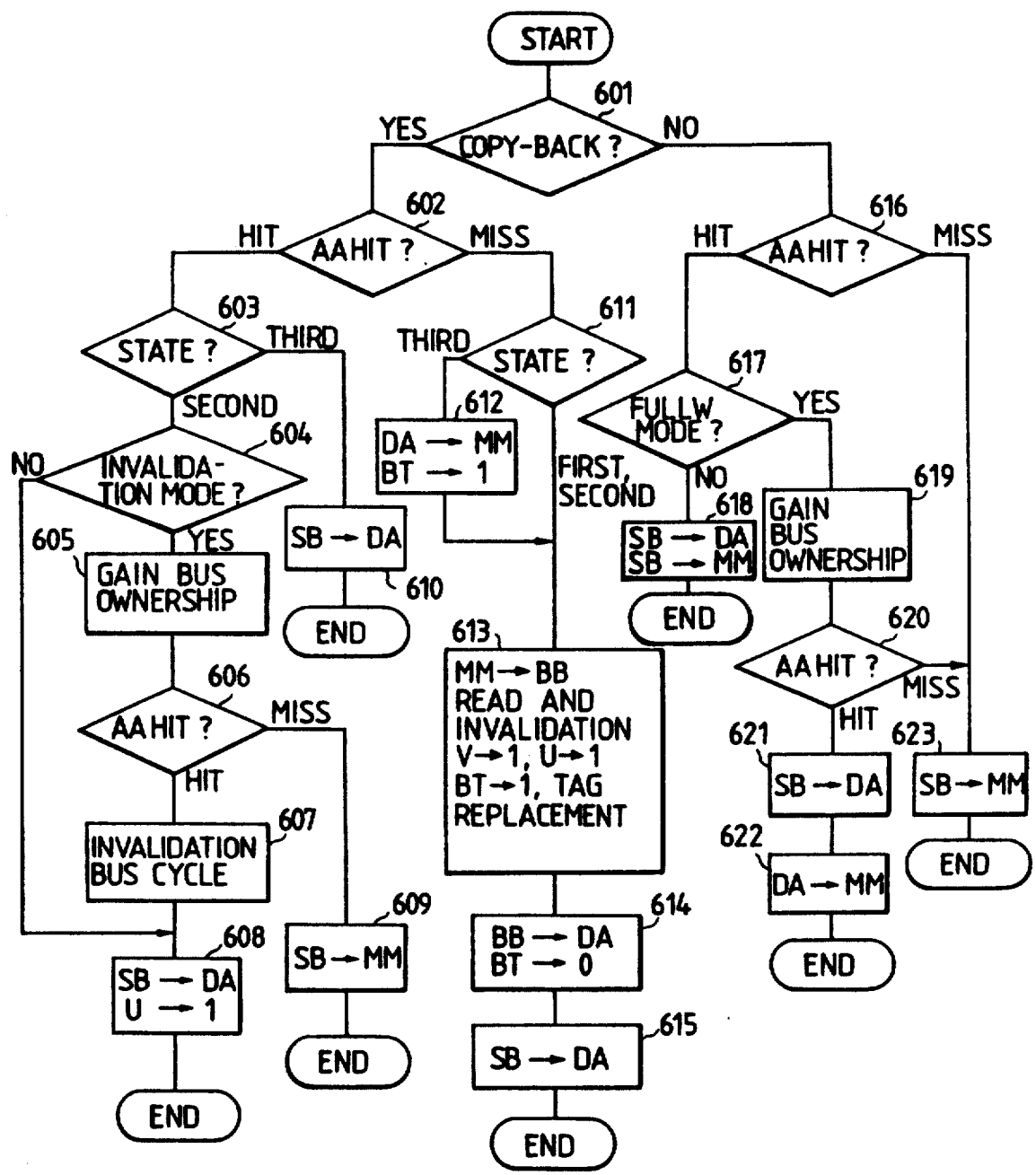

In the present embodiment, moreover, the cache control circuit 105 can select whether or not a full write modification processing, as will be described in detail with reference to the flow chart of FIG. 6, is to be executed. This setting is executed by a one-bit register 109 in the control circuit 105. When the register 109 takes the value "1", this is called the full write modification processing, and this full write is executed. Incidentally, the values of the two registers 108 and 109 are flags which can be set from the processor.

This cache control circuit 105 executes a variety of operations, as will be described in the following, in response to the access from the processor and the access from the main memory bus.

Invalidation Bus Cycle

First of all, if the data of the first cache memory (100:#1) is in the valid and non-updated second state when the write access from the first processor (1001) hits the first cache memory (100:#1), the data is shifted after the hit to the valid and updated third state, and the first cache memory (100:#1) outputs the address of the write hit and the invalidating signal to the aforementioned address bus (123) and the invalidating signal line (PURGE:131), respectively. In case, therefore, the second cache memory (100:#2) holds the data in the valid and non-updated second state relating to that address, the data in this second state is shifted to the invalid first state so that the cache coherency can be kept. When, on the other hand, the write access from the second processor (1002) hits the second cache memory (100:#2), the cache coherency is likewise kept. As a result, at the time of the write hit to the cache, the address of the write hit and the invalidating signal are outputted to the shared memory bus, but no block is transferred from the main memory (1004).

The outputs of the write hit address and the invalidating signal from the write hit cache to the main memory bus will be called the invalidation bus cycle.

In this invalidation bus cycle, the write hit cache outputs the PURGE signal 131="1" and the R/W signal 135="WRITE".

Block Read and Invalidation Bus Cycle

When the write access from the first processor (1001) misses the first cache memory (100:#1), this first cache memory (100:#1) outputs not only the write miss address to the address bus (123) to block-read the data of one block from the main memory (1004) but also the invalidating signal to the invalidating signal line (PURGE:131). After this, the first cache memory (100:#1) executes the write of the data relating to the aforementioned write miss of the block-read of one block. As a result, upon the write of the data relating to the write miss, the first processor (1001) is shifted from the invalid first state to the valid and updated third state, and the second cache memory (100:#2) is shifted from the valid and non-updated second state to the invalid first state so that the cache coherency is kept. When, moreover, the write access from the second processor (1002) misses the second cache memory (100:#2), the cache coherency is likewise kept.

The outputs of the address for the block read and the invalidating signal from the write miss cache to the main memory bus will be called the block read and invalidating bus cycle.

In this invalidation bus cycle, the write miss cache outputs the PURGE signal 131="1" and the R/W signal 135="READ".

Watching Operations of Main Memory Bus

In case the cache (100:#1 or #2) holds the data in the valid and updated third state relating to address of the access request relating to the read or write when said address is fed to the main address bus (123), said cache writes back said data by the block transfer so that it can realize the copy-back of the data in the valid and updated third state to the main memory according to the copy-back method.

When, moreover, another bus master (e.g., the input/output device) writes the data of one block of complete four words in the main memory, the BLOCK signal 133 and the R/W signal 135 are outputted by another bus master. At this time, let the case be considered, in which the cache holds the data in the valid and updated third state relating to the address from another bus master. If, in this case, said cache writes back said data in the main memory by the block transfer, the data of one block of the aforementioned four words is then written from another bus master in the main memory so that the aforementioned block transfer from the cache to the main memory has no meaning. At this time, in the present embodiment, the block transfer of the data in the valid and updated third state from the cache to the main memory is omitted, and the cache control circuit 105 responds to the BLOCK signal 133 and the R/W signal 135=WRITE signal so that the pertinent block of the cache may be invalidated.

Use of Both Copy-Back Method and Write-Through Method

As has been described hereinbefore, the cache 100 (#1 or #2) can execute both the write operations by the copy-back method of an ordinary data and by the write-through method of an exceptional data required to have a high reliability and is assumed to identify the write operations in accordance with the area of the write address. Therefore, the write address is decided for each processing from the store buffer 104 to determine which of the copy-back method and the write-through method is to be used. For this determination, the cache is equipped with an address decision circuit (although not shown) for deciding which of the address area of the copy-back method or the write-through method the address processed from the store buffer 104 belongs to, so that the cache control circuit 105 is controlled in accordance with the output of the decision result of the address decision circuit.

Relinquishment of Bus Ownership during Block-Transfer

According to the present embodiment, the bus ownership can be relinquished in the course of the block transfer between a cache and the main memory to a bus master (e.g., the input/output device) having a high priority with respect to the bus ownership of the main memory bus or a bus master (e.g., another cache) having an equal bus ownership.

For this relinquishment, it is identified whether or not each block of the cache is being block-transferred, and the procedures for eliminating the inconsistency of the cache are determined during the watch of the main memory address bus in the following manner in accordance with the identification result.

Procedure 1:

When the write access of the first processor misses the first cache, this cache executes the first access of the block transfer from the main memory by the read and invalidation bus cycle, as has been described hereinbefore, and changes the block in advance into the aforementioned third state. In the course of this block read transfer, another bus master may possibly access the main memory during a bus non-use period between one word being block-transferred and another succeeding word.

At this time, the block to be block-transferred from the main memory to the first cache and the block accessed by another bus master may possibly be different from each other.

If, in this case, the block corresponding to the address accessed by another bus master is in the valid and updated third state within the first cache and the access by another bus master is in the bus nonuse period of the block transfer from the main memory to the first cache, the block being in the third state and accessed by another bus master is written back from the first cache to the main memory device. After this write-back, the access from another bus master to the main memory is executed. Moreover, the remaining portion of the block transfer between the main memory and the first cache, which results from the fact that the write access of the first processor misses the first cache, is completed.

On the other hand, the block being block-transferred from the main memory to the first cache as a result of the fact that the write access of the first processor misses the first cache may possibly be identical to the block being accessed from another bus master. At this time, the block corresponding to the address accessed by another bus master is naturally in the valid and updated third state within the first cache. First of all, the remaining portion of the block transfer being transferred from the main memory to the first cache due to the miss of the first cache is completed, and the write operation of writing the write data of the first processor in the block data stored from the main memory in the first cache is executed in a preceding manner. After this, the block being in the valid and updated third state and accessed by another bus master is written back in the main memory device, and then another bus master secures the bus ownership. This reasoning is based upon the following fact.

If another bus master requests the same block as that being transferred from the main memory to the first cache, it is assumed that the requested block is instantly written back from the first cache to the main memory so that the pertinent block of the first cache is shifted from the valid and updated third state to the invalid first state. On the other hand, the final cache write operation upon the write miss of the first cache is not enabled before the data of one block of four words is transferred from the main memory. Since, however, the block of the first cache has already been brought into the invalid first state, the first cache cannot execute the write operation of the valid data. In other words, there arises a problem that the data at the time of the write operation of the first cache from the first processor disappears from the first cache. In order to solve this problem, the present embodiment adopts the procedure thus far described.

Procedure 2:

On the other hand, the block replacement is executed when the read or write accesses from the first processor miss the first cache. If, at this time, one block to be expelled from the first cache in accordance with the block replacement is in the valid and updated third state, said block is written back from the first cache to the main memory.

At this time, the block to be written back by the block transfer from the first cache to the main block may possibly be different from the block accessed by another master having a bus ownership of a high priority or another bus master having an equal bus ownership.

If the block corresponding to the address accessed by another bus master is then in the valid and updated third state within the first cache and the access by another bus master is in the bus nonuse period of the block transfer from the first cache to the main memory, the block being in the third state and accessed by another master is written back from the first cache to the main memory device. After this write-back, the access from another master to the main memory is executed. Moreover, the remaining portion of the block transfer for the write-back from the first cache to the main memory as a result of the fact that the write access of the first processor misses the first cache is completed.

On the other hand, the replacement block being block-transferred from the first cache to the main memory as a result of the fact that the write or read access of the first processor misses the first cache may possibly be identical to the block write-accessed from another bus master. At this time, the block corresponding to the address accessed by another bus master is naturally in the valid and updated third state within the first cache. First of all, the transfer of the remaining portion of the block transfer from the first cache to the main memory due to the miss of the first cache is completed. After this, the block transfer of the relevant block requested by another bus master from the first cache to the main memory is executed again to shift the relevant block from the valid and updated third state to the invalid first state. After this, another bus master secures the bus ownership. This reasoning is based upon the following fact.

In case another bus master requests the same block as the block being transferred from the first cache to the main memory, it is assumed that the first cache writes back the requested block instantly to the main memory and that the relevant block of the first cache is shifted from the valid and updated third state to the invalid first state. After this, the write access is executed from another bus master to the main memory so that the data by the write of another bus master is written in the replacement block on the main memory. After this data write, however, the remaining portion (i.e., the invalid data) of the block transfer being transferred from the first cache to the main memory as a result of the miss of the first cache is written in the replacement block on the main memory. As a result, there arises a problem that the write data by another bus master partially disappears from the main memory. In order to solve this problem, the procedure thus far described is adopted in the present embodiment.

Operation Flow of Cache Memory

The operation flow of the cache memory will be described in the following. Incidentally, in FIGS. 4 to 9, the square blocks of the flow charts indicate the data transfers mainly. Reference letters MPU designate a processor; letters MM a main memory; letters AA an address array 101; letters DA a data array 102; letters BB a block buffer 103; and letters SB a store buffer 104.

Figure 4:
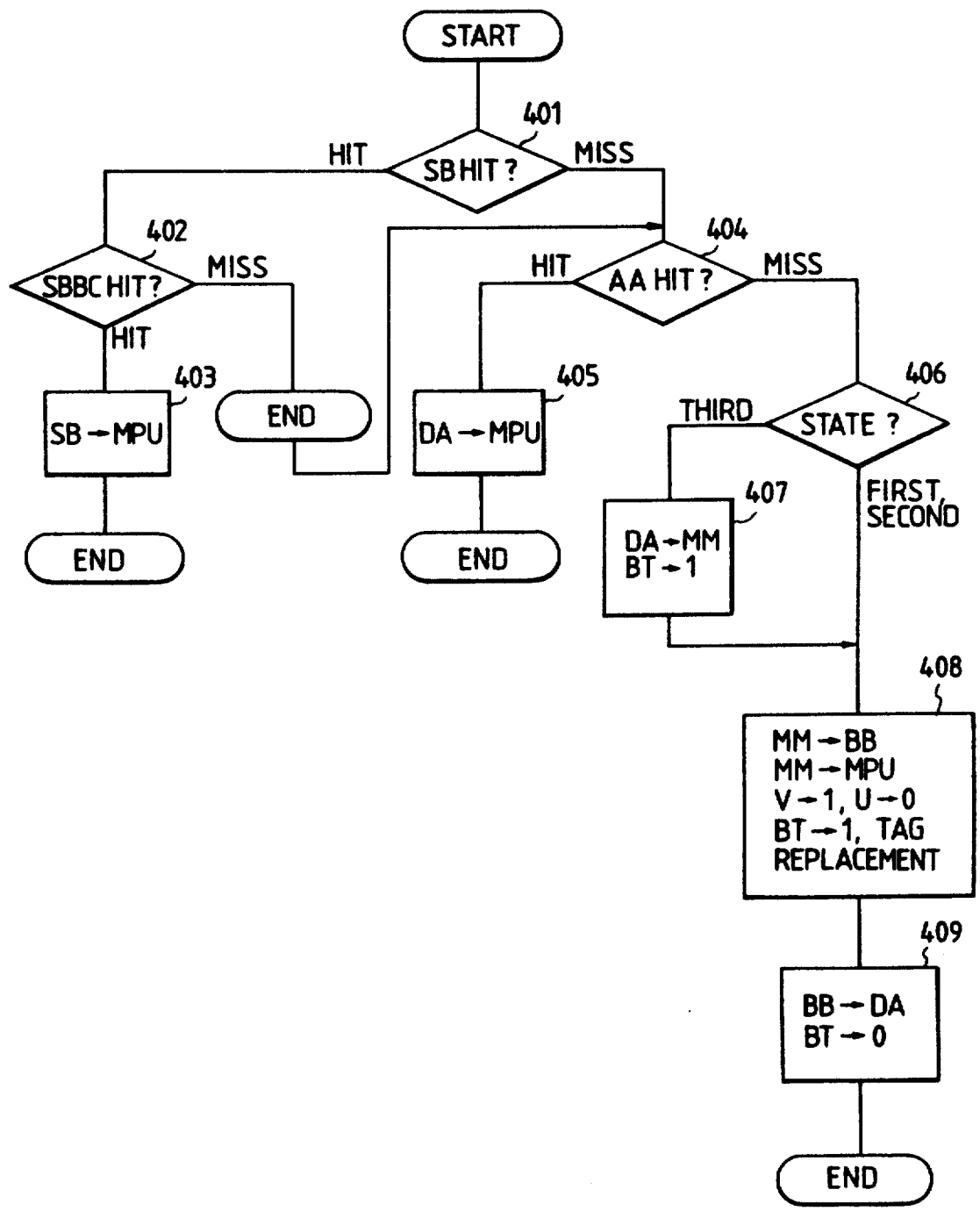
FIG. 4 is a flow chart showing the operations of the cache memory of FIG. 2 when a read access is generated from a processor.

The operation flow of the cache when a read access is generated from a processor is shown in FIG. 4.

Start: The operation of the cache is started by said read access and is shifted to a step 401.

Step 401: The address in the store buffer 104 and the read request address from the processor are compared. If coincident (as called the SB hit in the Drawing), the procedure is shifted to a step 402. Otherwise (as called the SB miss in the Drawing), the procedure is shifted to a step 404.

Step 402: The byte control of a portion having a coincident address in the store buffer 104 and the byte control of the read request are compared. If the latter is contained in the former (as called the SBBC hit in the Drawing), the procedure advances to a step 403. Otherwise (as called the SBBC miss), the data cannot be fed from the store buffer 104 to the processor. Therefore, the operation is shifted to the step 404 after the address and the data have been processed from the store buffer 104.

Step 403: This operation is ended by feeding the data from the store buffer 104 to the processor.

Step 404: The address array 101 is searched in accordance with the address of the read access from the processor. If hit, the operation advances to a step 405. If missed, the operation advances to a step 406.

Step 405: This operation is ended by transferring a request data from the data array 102 to the processor.

Step 406: The block is replaced on and after this operation. The state processing unit 151 of the cache control circuit 105 decides the state of the block to be expelled. If this block to be expelled is in the valid and updated third state (in which the signal line 147="1", i.e., V=U="1"), the operation advances to a step 407. If in the invalid first state (in which the signal line 145="1", i.e., V="0") or in the valid and non-updated second state (in which the signal line 146="1", i.e., V="1" and U="0"), the operation advances to a step 408.

Step 407: The address to be expelled is set in the address register 106. This address register 106 is caused to execute its counter operation thereby to transfer the data of one block to be expelled from the data array 102 to the main memory. Here, the block-transfer bit (BT bit) of the address array 101 is rewritten to 1 simultaneously with the first transfer. After this, the operation advances to the step 408.

Step 408: The read request address is set in the address register 106. This address register 106 is caused to execute the counter operation thereby to transfer the data of one block requested from the main memory to the block buffer 103. Here, simultaneously with the first transfer, the tag (at an upper address) of the address array 101 is rewritten to the upper address of the read request address, and the V bit, U bit and BT bit of the address array 101 are rewritten to "1", "0" and "1", respectively. Simultaneously with the first data transfer, moreover, the gates 114 and 116 connected with the processor side data line 124 and the main memory side data line are rendered operative for the data transfer, and the data is transferred to the processor, too, from the main memory. On and after the second transfer, the output of the address register 106 is fed only to the main memory bus address line 123, but the internal address line 122 and the internal data line 125 are not used. If, in the meantime, the read request and the store buffer processing request are generated, the restricted read and the restricted store buffer processing are respectively started. After this, the operation advances to a step 409.

Step 409: The address register 106 is caused to the counter operation thereby to transfer a data of 16 bytes at one time from the block buffer 103 to the data array 102 through the internal bus 127. Simultaneously with this first transfer (i.e., the transfer of the first word of 4 bytes), the BT bit of the address array 101 is set to "0". After this, the processing is ended.

Figure 5:
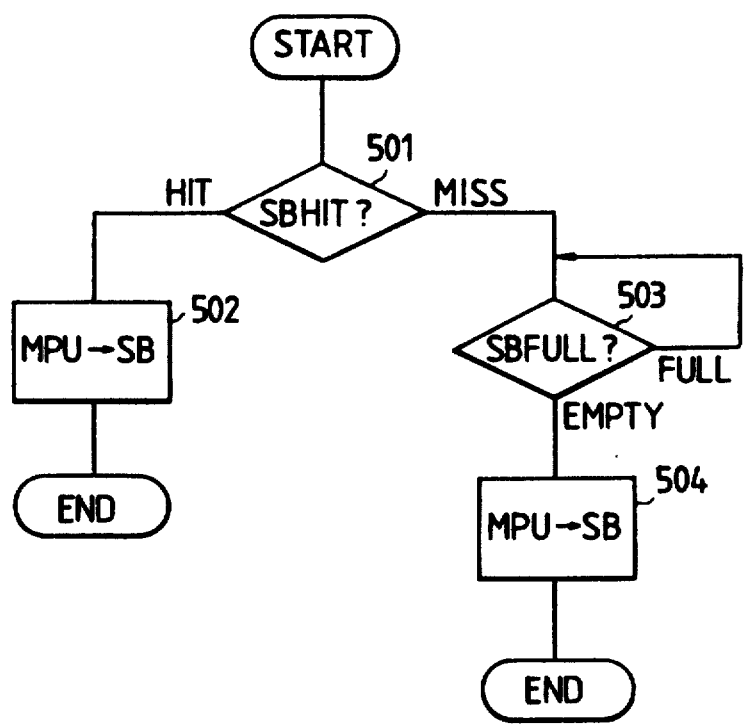
FIGS. 5 and 6 are flow charts showing the operations of the cache memory of FIG. 2 when a write access is generated from a processor.

The processing flow when the write access of a processor is generated is shown in FIGS. 5 and 6.

FIG. 5 shows the processing of the write from the processor to the store buffer 104.

Start: The operation of the cache is started by said write access, and the operation advances to a step 501.

Step 501: the address in the store buffer 104 and the write address of the processor are compared. If coincident, the operation advances to a step 502. Otherwise, the operation advances to a step 503.

Step 502: The write operation from the processor to the store buffer 104 is ended by writing the address and data at the coincident level of the store buffer 104.

Step 503: If the store buffer 104 is full, the entrance of the step 503 is returned after one cycle. Otherwise (if the store buffer 104 has an empty level, the operation advances to a step 504.

Step 504: Since the store buffer 104 has a new level (empty), the operation is ended by writing the address and data in that level.

The processing when at least one element (i.e., one set of address and data) is stored in the store buffer 104 is shown in FIG. 6.

Start: The address and data at the leading level of the store buffer 104 are read, and the operation advances to a step 601.

Step 601: The address read from the store buffer 104 is decided. If this address is within a copy-back applicable area, the operation advances to a step 602. Otherwise (within a write-through applicable area), the operation skips to a step 616.

Step 602: The address array 101 is searched by using the address read from the store buffer 104. If said address hits the address array 101, the operation advances to a step 603. If missed, the operation skips to a step 611.

Step 603: The state processing unit 151 decides the state of the hit cache block. This hit block cannot take the invalid first state. If, therefore, the hit block is in the valid and non-updated second state (in which the signal line 146="1", i.e., V="1" and U="0"), the operation advances to a step 604. If the block is in the valid and updated third state (in which the signal line 147="1", i.e., V=U="1"), the operation advances to a step 610.

Step 604: When the invalidation bus cycle instruction mode is designated by the register 108, the operation advances to a step 605. Otherwise, the operation skips to a step 608.

Step 605: The cache gains the bus ownership of the main memory by the bus arbitrating unit (i.e., the bus arbiter). After this bus ownership has been gained, the operation advances to a step 606.

Step 606: The address array 101 is searched again. This search of the address array 101 is executed for considering that the block hit at the step 603 has been invalidated as a result that the data of another cache has been shifted to the valid and updated third state till the gain of the bus ownership. If the block is missed at the step 606 by the invalidation, the operation advances to a step 609 of the write according to the exceptional write-through method. If hit at the step 606, on the other hand, the operation advances to a step 607 of the invalidation bus cycle.

Step 607: The invalidation bus cycle is issued on the main memory bus for the invalidating signal 131 (i.e., the PURGE signal)=1 and the read/write signal 135 (i.e., the R/W signal)=WRITE. Then, the operation advances to the step 608.

Step 608: The data of the store buffer 104 is written in the data array 102 to set the update bit (i.e., the U bit) of the corresponding address array 101 to 1 and the write hit block to the valid and updated third state. After this, the pointer of the store buffer 104 is proceeded by one to end the processing.

Step 609: Upon this writing operation upon the write miss according to the exceptional write-through method, the data of the store buffer 104 is written in the main memory but not in the data array 102. After this, the pointer of the store buffer 104 is proceeded by one to end the processing.

Step 610: When the block at the time of the write hit is in the valid and updated third state, another cache corresponding to the address at this write hit time has already been invalidated. As a result, the cache writing operation at this time is satisfied by writing the data of the store buffer 104 in the data array 102. After this, the pointer of the store buffer 104 is proceeded by one to end the processing.

Step 611: In accordance with the write miss, the block of the cache is replaced. The state processing unit 151 of the cache control circuit 150 decides the state of the block to be expelled by the block replacement. The operation then advances to a step 612 if the block to be expelled is in the valid and updated third state (in which the signal line 147="1", i.e., V=U="1"). If the block is in the invalid first state (in which the signal line 145="1", i.e., V="0") or in the valid and non-updated second state (in which the signal line 146="1", i.e., V="1" and U="0"), the operation advances to a step 613.

Step 612: The address of the block to be expelled is set in the address register 106. This address register 106 is caused to execute the counter operation thereby to transfer the data of one block to be expelled from the array 102 to the main memory. Here, simultaneously with the first transfer of the first word of one block, the block transfer bit (i.e., the BT bit) of the address array 101 is rewritten to "1". After this step 612, the operation advances to the step 613.

Step 613: The address of the store buffer 104 is set in the address register 106. The address register 106 is caused to execute the counter operation thereby to transfer the data of one block requested from the main memory to the block buffer 103. Here, the first transfer is executed in the read invalidation bus cycle for the read/write signal (i.e., the R/W signal 135)=READ and the invalidating signal (i.e., the PURGE signal 131)="1". Simultaneously with the first transfer, moreover, the tag of the address array 101 is rewritten to the upper address of the store buffer, and the V bit, U bit and BT bit of the address array 101 are rewritten to "1", "1" and "1". On and after the second transfer, the output of the address register 106 is fed only to the main memory bus address line 123, but the internal address line 122 and the internal data line 125 are not used. If the read request is generated for the time period from the second transfer to the final transfer, the restricted read processing is started. After the step of the process 613, the operation advances to a step 614.

Step 614: The address register 106 is caused to execute the counter operation thereby to transfer the data of 16 bytes for one time from the block buffer 103 to the data array 102. Simultaneously with this first transfer, the BT bit of the address array 101 is set at "0". After this, the operation advances to a step 615.

Step 615: The data of the store buffer 104 is written in the data array 102. The pointer of the store buffer 104 is proceeded by one. Then, the processing is ended.

Step 616: The data write according to the write-through method is processed.

The following problems may arise in case a request for a partial write is raised from the processor upon the data write according to the write-through method.

First of all, the full write means the write of a complete data of one word composed of four bytes. On the other hand, the partial write means the write of a data having valid data less than four bytes. Upon this partial write, whether each byte of one word is valid or invalid is designated in dependence upon whether the level of the byte control signal from the processor is at "1" or "0". Therefore, the full write is requested in case the byte control signal of four bits from the processor is wholly at "1".

It is imagined that the cache executes the write (i.e., the write of the cache and the main memory at the time of the write hit) according to the write-through method in response to the request of a partial write from the processor. At this time, the error correction of the data is generally executed at the main memory. For this, the data of the main memory before the write of the write-through method and the error correction data corresponding to the former data are saved in suitable storing means. After this, the valid data of the partial write designated by the byte control signal and the valid data in the storing means non-designated by said byte control signal have to be concatenated to write back these concatenated data and the corresponding error correction data in the main memory. Thus, the data have to be reciprocated between the main memory and the storing means to raise a defect that the time period necessary for the write is elongated.

In order to avoid this defect, according to the present embodiment, the partial write from the processor to the cache is executed upon the cache by the control of the byte control signal, and the data of complete one word of four bytes written in said cache is then transferred from said cache to the main memory. This processing is executed at later-described steps 617 to 622 and is called the full write modification processing of the partial write data.

First of all, it is decided at the step 616 whether or not the write access from the processor hits the address array 101 of the cache. By using the address of the store buffer 104, more specifically, the address array 101 is searched. In the miss at the time of the write access of the write-through method, the write data may be written only in the main memory, and the operation skips to a step 623. If hit, the write data has to be written in the cache and the main memory, and the operation advances to a step 617.

Step 617: It is determined whether or not the full write modification processing of the partial write data is in the requested mode.

If, therefore, the full write mode is not designated by the register 109 in the cache control circuit 105, the operation advances to a step 618, at which the write (to transfer the data from the processor substantially simultaneously to the cache and the main memory) according to the ordinary write-through method is executed.

Step 618: The data of the store buffer 104 is written in the data array 102 and the main memory according to the ordinary write-through method. Incidentally, upon the write in the main memory, the cache has naturally gained the bus ownership. After execution of the write, the pointer of the store buffer is proceeded by one to end the processing.

If, on the other hand, the full write mode is designated by the register 109, the operation advances to a step 619 for gaining the bus ownership and a step 620 for searching the address.

The necessity for advancing to the steps 619 and 620 is as follows.

It is now imagined that the write accesses from the first and second processors hit individual caches and request the partial writes in connection with different valid bytes. It is further imagined that the access of the partial write of the second processor in the second cache is issued with a slight delay from the partial write access of the first processor in the first cache and that the full write modification processings of the partial write data are requested from the two processors.

In this case, the data in the first cache is partially written in connection with the first portion designated by the byte control signal from the first processor so that the complete one word data of four bytes of the first portion which has been effected by the partial write is transferred from the first cache to the main memory. Since, on the other hand, the relevant data of the second cache is invalidated by the address at the data transfer time from the first cache to the main memory, the write access from the second processor to the second cache is missed by the aforementioned invalidation although it should have naturally been hit at the beginning of the access. As a result, the data to the second cache is partially written in the invalidated data of the second cache in connection with the second portion designated by the byte control signal from the second processor. After this, the data of one word of four bytes after the partial write of the second portion is transferred from the second cache to the main memory. In the data to be transferred at this time from the second cache to the main memory, however, the data other than the data of the second portion designated by the byte control signal from the second processor is the old invalid data before the write access from the second processor to the second cache. As a result, this old invalid data is also transferred from the second cache to the main memory, thus raising a problem that the valid data of the first portion transferred beforehand from the first cache to the main memory and designated by the first processor is replaced over the main memory by the old invalid data.

The steps 619 and 620 according to the present embodiment solves that problem by the reasoning, as will be described in detail in the following.

Specifically, the processings are different for the timings between gaining the bus ownership by the partial write access of the first processor to the first cache and gaining the bus ownership by the partial write access of the second processor to the second cache.

The contents of the steps 619 and 620 will be described in the following.

Step 619: The cache gains the bus ownership of the main memory by the bus arbitrating unit (i.e., the bus arbiter), and the operation then advances to the step 620.

Step 620: The address array 101 is searched again. The operation advances to a step 621, if hit, but skips to a step 623 if missed.

If, for example, the gain of the bus ownership by the partial write access of the first processor to the first cache is earlier than the gain of the bus ownership by the partial write access of the second processor to the second cache, the operations of the first and second caches are, as follows.

Since, at the time of gaining the bus ownership, the earlier first cache is not invalidated yet by the address of the write access of the second cache through the main memory bus, the address of the write access from the first process hits the first cache. As a result, the operation of the first cache advances from the step 620 to the full write modification processings of the steps 621 and 622.

These full write modification processings of the first cache at the steps 621 and 622 are, as follows.

Step 621: In the first cache, the data of the store buffer 104 relating to the first portion designated by the byte control signal from the first processor is partially written in the data array 102, and the operation advances to the step 622.

Step 622: The data of one word of four bytes after the partial write of the first portion is transferred from the first cache to the main memory. Specifically, the data having the width of one bus access of the data array 102 of the first cache is written in the main memory. After this, the pointer of the store buffer 104 is proceeded by one to end the processing.

At the time of acquiring the bus ownership of the later second cache bus, on the other hand, the second cache has already been invalidated by the address of the write access of the first cache through the main memory bus so that the address of the write access from the second processor misses the second cache. As a result, the operation of the second cache skips from the step 620 to the partial write in the main memory at the step 623.

The partial write in the main memory at the step 623 of the second cache is, as follows.

Step 623: In connection with the second portion designated by the byte control signal from the second processor, the data of the store buffer 105 of the second cache is written in the main memory. After this, the pointer of the store buffer 104 is proceeded by one to end the processing.

As a result, in the main memory after those steps 621, 622 and 623, the valid data from the first processor relating the first portion designated by the first processor is partially written, and the valid data from the second processor relating to the second portion designated by the second processor is partially written, so that the aforementioned problem can be solved.

Figure 7:
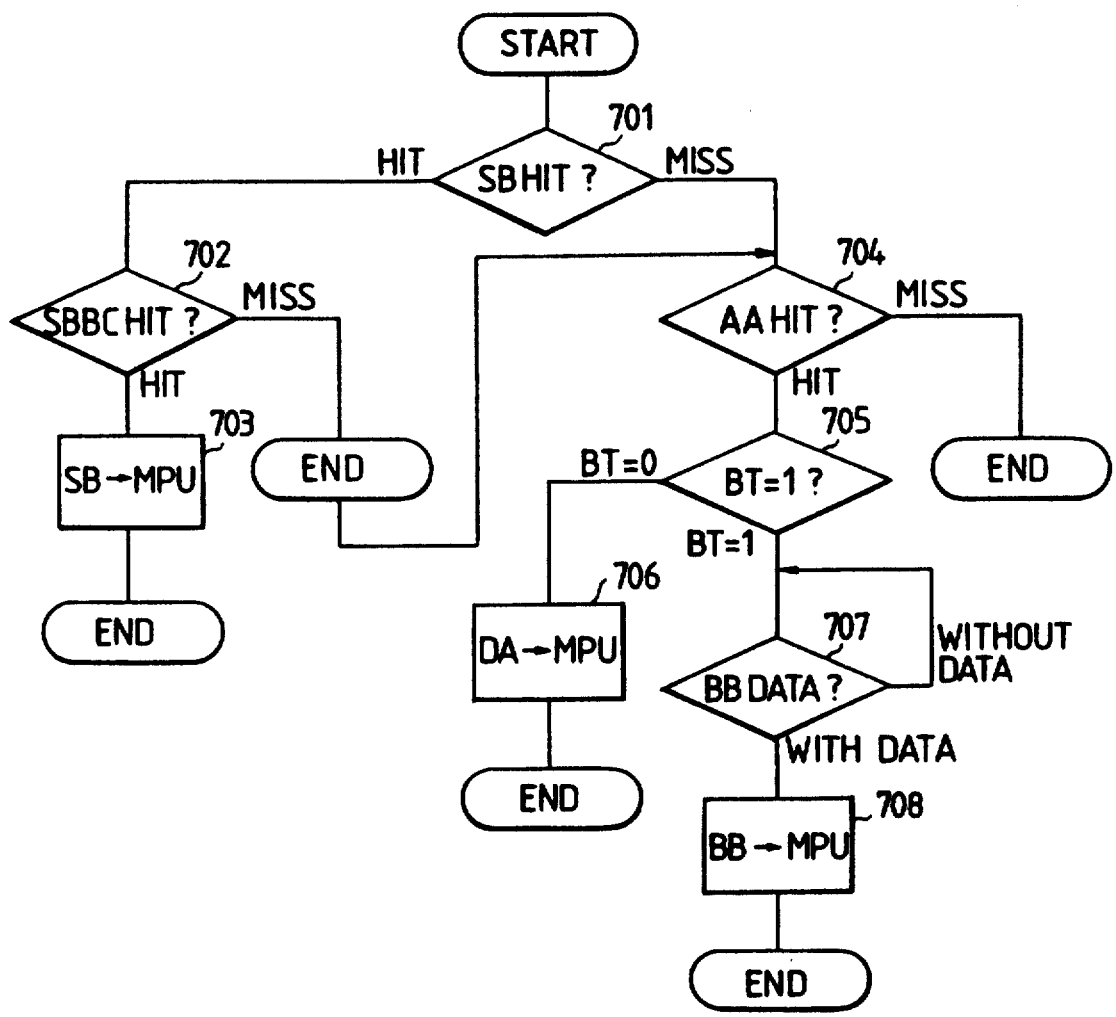
FIG. 7 is a flow chart showing the processing operations of the restricted read of the cache memory of FIG. 2.

FIG. 7 is a flow chart of the cache processing (i.e., the restricted read processing in the presence of another read request from the processor to the store buffer) which can be executed in parallel with either the step 408 of the block transfer from the main memory to the block buffer 103 for the block replacement at the read miss time of FIG. 4 or the step 613 of the block transfer from the main memory to the block buffer 103 for the block replacement at the write miss time of FIG. 6.

Start: The processing is started in response to the read request, and the operation advances to a step 701.

Step 701: The address in the store buffer 104 and the read request address are compared. If coincident (or hit), the operation advances to a step 702. Otherwise, the operation skips to a step 704.

Step 702: The byte control of the coincident portion of the store buffer 104 and the byte control of the read request are compared. If the latter is contained in the former, the operation advances to a step 703. Otherwise, the data cannot be fed from the store buffer 104 to the processor. Therefore, the operation skips to the search of the address array 101 at a step 704 after the end of the processing of the address and data from the store buffer 104.

Step 703: The operation is ended by feeding the data from the store buffer 104 to the processor.

Step 704: The address array 101 is searched. If hit, the operation advances to a step 705. Otherwise (or if missed), the main memory bus has to be used, and no data can be fed from the data array 102 to the processor.

Thus, the operation is returned to the start of FIG. 4 after the end of the block transfer from the main memory to the block buffer 103.

Step 705: If the BT bit resulting from the search of the address array 101 is at "0" (if the block is different from the block being block-transferred for the block replacement from the main memory to the block buffer 103), the operation advances to a step 706.

If the aforementioned BT bit is at "1" (if the block identical to the block being block-transferred for the block replacement from the main memory to the block buffer 103), the operation advances to a step 707.

Step 706: The processing is ended by transferring the data from the data array 102 to the processor.

Step 707: If the read request data has already been transferred to the block buffer 103, the operation advances to a step 708. Otherwise, the operation is returned to the step 707 after one cycle has been awaited.

Step 708: The processing is ended by transferring the data from the block buffer 103 to the processor.

Figure 8:
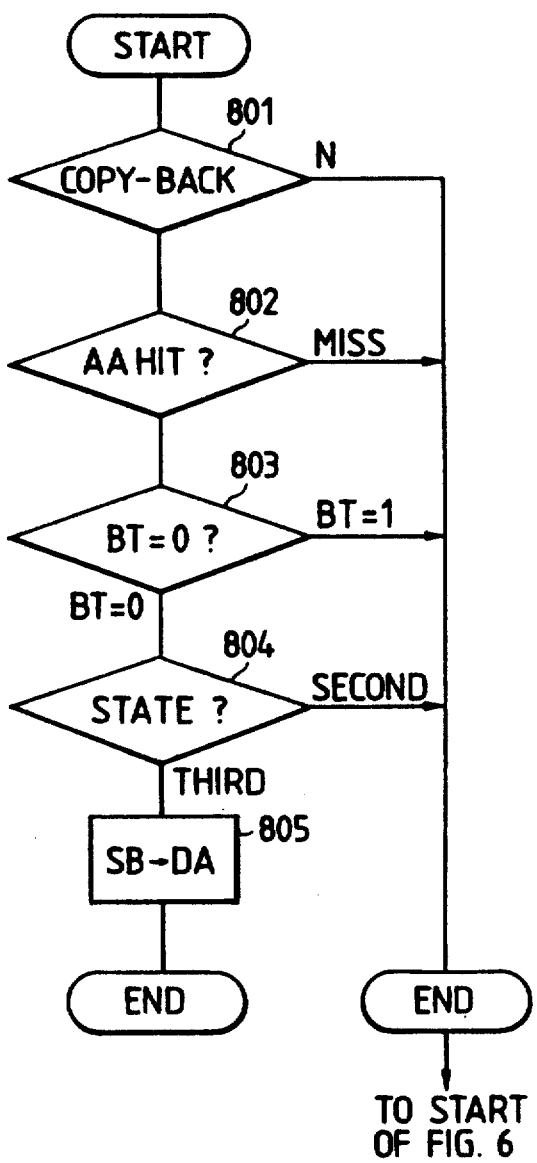
FIG. 8 is a flow chart showing the operations of the restricted store buffer processing of the cache memory of FIG. 2.

FIG. 8 is a flow chart showing the processing (i.e., the restricted store buffer processing) of the address and data from the store buffer 104 in accordance with the write access from the processor, which processing can be accomplished in parallel with the main memory access at the step 408 of the block transfer for the block replacement at the read miss time of FIG. 4 from the main memory to the block buffer 103.

Start: The address and data at the leading level of the store buffer 104 are read out, and the operation advances to a step 801.

Step 801: The address is determined, and the operation advances to a step 802 if the address is within a copy-back applicable area. Otherwise (within the write-through applicable area), the main memory bus has to be used. After the operation has been ended, it is returned to the start of FIG. 6.

Step 802: The address array 101 is searched by using the address of the store buffer 104. If hit, the operation advances to a step 803. If missed, the main memory bus has to be used. After the operation has been ended, it is returned to the start of FIG. 6.

Step 803: If the searched BT bit of the address array 101 is at "0" (if the block different from the block being block-transferred for the block replacement from the main memory to the block buffer 103 receives the write request), the operation advances to a step 804. If, on the other hand, the aforementioned BT bit is at "1" (if the block identical to the block being block-transferred for the block replacement from the main memory to the block buffer 103 receives the write request), the operation is returned to the start of FIG. 6.

Step 804: The state processing unit 151 of the cache control circuit 150 determines the state of the hit block. This hit block cannot take the invalid first state. If the hit block is in the valid and updated third state (in which the signal line 147="1", i.e., V=U="1"), the operation advances to a step 805. If, on the other hand, the hit block is in the valid and non-updated second state (in which the signal line 146="1", i.e., V="1" and U="0"), the invalidation bus cycle has to be issued for the write hit to the main memory bus. Then, the operation is returned to the start of FIG. 6 by ending the operations.

Step 805: Since the hit block is in the valid and updated third state, the invalidation bus cycle need not be issued. As a result, the write operation of the cache at this time is sufficed by writing the data of the store buffer 104 in the data array 102. After this, the pointer of the store buffer 104 is proceeded by one to end the processing.

Figure 9:
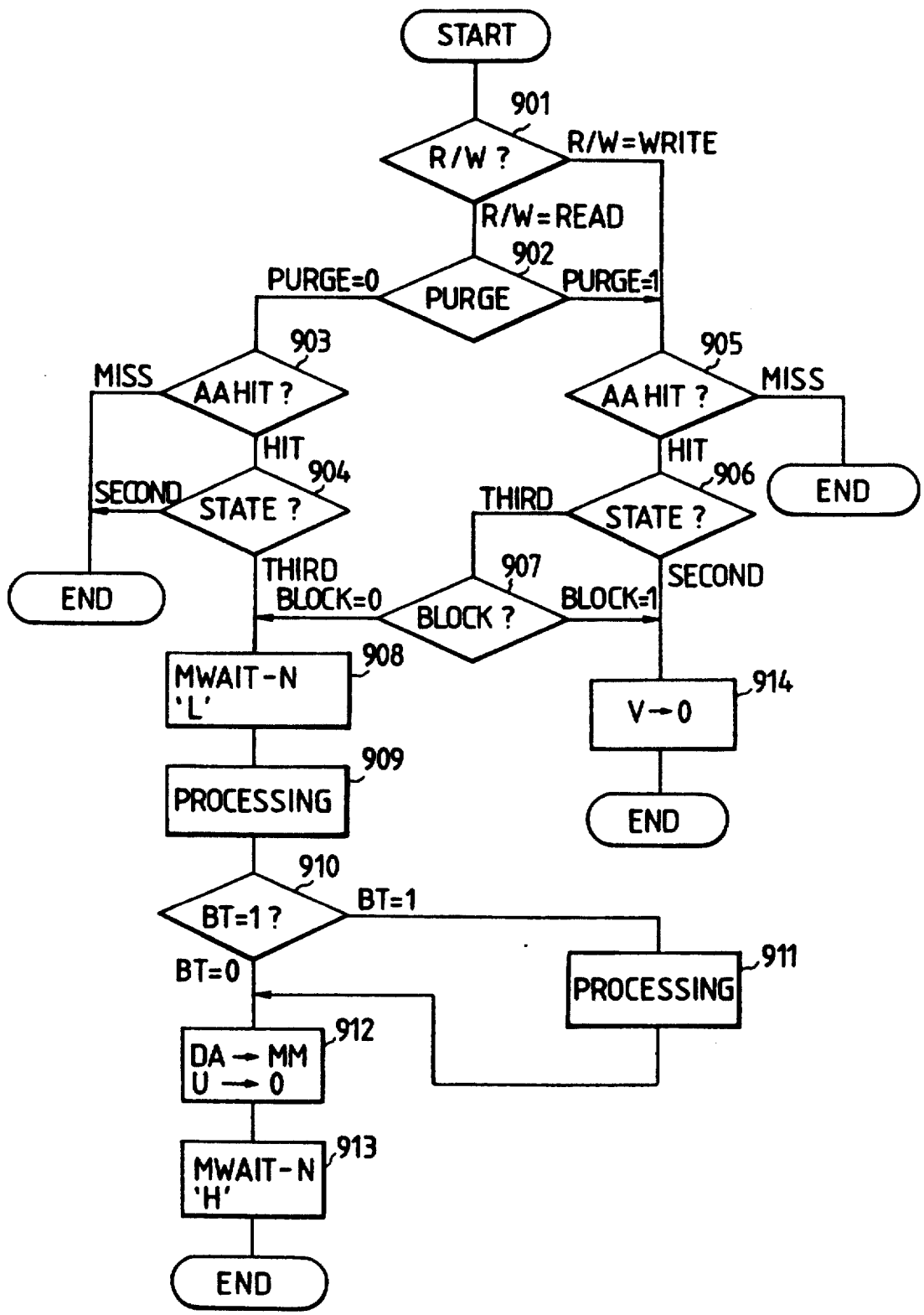
FIG. 9 is a flow chart showing the watching and processing operations of the main memory bus of the cache memory of FIG. 2.
Figure 10:
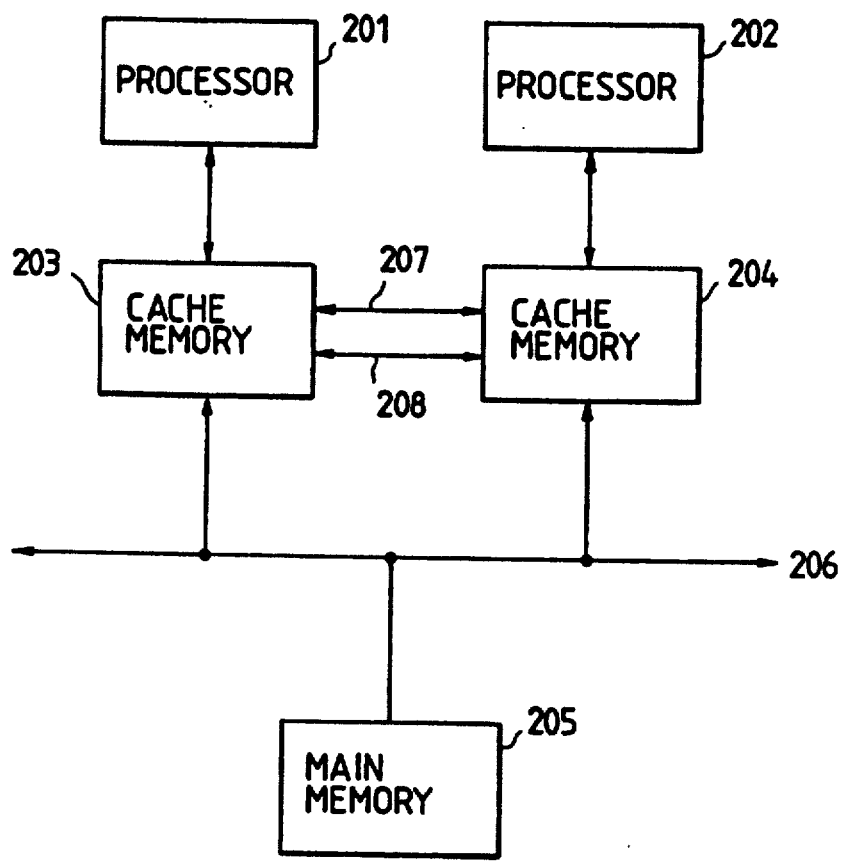
FIG. 10 is a diagram showing the structure of the multiprocessor system which is well known in the prior art.

The flow chart for the watching operation of the main memory bus of the cache is shown in FIG. 9.

Start: If the bus cycle is executed over the main memory bus, the operation of the cache is started to advance to a step 901.

Step 901: If the R/W signal 135 on the main memory bus indicates the read, the operation advances to a step 902. If the R/W signal 135 indicates the write, the operation skips to a step 905.

Step 902: If the PURGE signal 131 on the main memory bus is at "0", the operation advances to a step 903. If the PURGE signal 131 is at "1", the operation skips to the step 905.

Step 903: The address array 101 is searched by the address of the main memory bus. If hit, the operation advances to a step 904. Otherwise (if missed), the cache has no relation to the read access on the main memory bus so that the processing is ended.

Step 904: If hit, the cache may possibly have a relation to the read access on the main memory so that the state processing unit 151 of the cache control circuit 150 decides the state of the hit block. This hit block cannot take the invalid first state. If the hit block is in the valid and updated third state (in which the signal line 150="1", i.e., V=U="1"), the operation advances to a step 908. If the hit block is in the valid and non-updated second state (in which the signal line 149="1", i.e., V="1" and U="0"), the cache need not reply to the read request on the main memory, and the processing is ended.

Step 905: If the write access exists or the read access and the invalidating signal exist on the main memory bus, the address array 101 is searched with the address of the main memory bus. If hit, the operation advances to a step 906. Otherwise, the processing is ended.

Step 906: The state processing unit 151 decides the state of the hit block. This hit block cannot take the invalid first state. If the hit block is in the valid and updated third state (in which the signal line 150="1", i.e., V=U="1"), the operation advances to a step 907. If in the valid and non-updated second state (in which the signal line 149="1", i.e., V="1" and U="0"), the operation skips directly to a step 914 for the purpose of invalidations.

This direct shift from the step 906 to the step 914 indicates the invalidating operation in which the valid and non-updated second data of the cache having hit the address of the write or read invalidation request of the main memory is brought into the invalid first state.

Step 907: If the read/write signal 135 (i.e., the R/W signal) on the main memory bus=WRITE and if the BLOCK signal 133 indicating that the bus master having requested the write access requests the block transfer of one block (of four words) is at "1", the operation advances to the step for the invalidations.

Under otherwise conditions, the operation advances to a step 908.

The indirect shift through the step 907 from the step 906 to the step 914 corresponds to the fact that the valid and updated third data of the cache, which was hit when another bus master (e.g., the input/output device) is to write the data of one block of complete four words in the main memory, is not transferred (while omitting the block transfer of the valid and updated third data in the watching operation of the main memory bus from the cache to the main memory) from said cache to the main memory but invalidated in the cache.

On the other hand, the bus master may issue the block read and invalidation bus cycle, as has been described hereinbefore. Upon this operation, the bus master outputs the PURGE signal 131, the BLOCK signal 133 and the R/W signal=READ to the main memory bus. In case the valid and updated third data hits the address of that block read/write operations, the operation is shifted through the steps 901, 902, 905, 906 and 907 to the step 908 because said third data has to be written back from the cache to the main memory.

In case, on the other hand, the valid and updated third data of the cache hits the address of the read access request to the main memory by the bus master, the operation is shifted through the steps 901, 902, 903 and 904 to the step 908 because said third data has to be written back from the cache to the main memory.

Step 908: In order to write back the valid and updated third data of the cache to the main memory, the access to the main memory by another cache has to be interrupted. For this necessity, the main memory wait signal 132 (i.e., the NWAIT-N signal: the negative logical signal having an electric value at a low level) is asserted. In order to execute the write-back of a later step 912, on the other hand, the address of the main memory bus is set in the main memory searching address register 107, and the operation advances to a step 909.

Step 909: If at the stage before the completion of the first transfer of the step 407 (i.e., the block transfer of the valid and updated third data from the cache to the main memory at the read miss time) of FIG. 4, the step 407 is completed beforehand. If at the stage before the completion of the first transfer of the step 612 (i.e., the block transfer: DA→MM of the valid and updated third data from the cache to the main memory at the write miss time) of FIG. 6, the step 612 is completed beforehand.

If in the course of executing the step 614 (i.e., the data storing process: BB→DA from the main memory to the cache at the write miss time) of FIG. 6, the step 614 is completed beforehand. If in the course of executing the step 615 (i.e., the data storing process: SB→DA from the processor to the cache at the write miss time) of FIG. 6, the step 615 is completed beforehand. After this, the operation advances to a step 910.

Step 910: If the block transfer bit (i.e., the BT bit) is at the value "0" as a result of the search of the address array 101 (if the bus master of the main memory bus requests a block different from the block to be transferred between the cache and the main memory in accordance with the read miss or write miss from the processor to the cache), the operation advances to an interruption step 912 relating to the procedure 1 or 2, as has been described hereinbefore.

If, on the other hand, the block transfer bit (i.e., the BT bit) is at the value "1" as a result of the search of the address array 101 (if the bus master of the main memory bus requests a block identical to the block to be transferred between the cache and the main memory in accordance with the read miss or write miss from the processor to the cache), the operation advances to a non-interruption step 911 relating to the procedure 1 or 2.

Step 911: If at the stage of the first transfer completion of the step 407 and the step 612 (DA→MM) or in the course of executing the step 613 (MM→BB), the remaining steps 407, 612 and 613 are completed beforehand, and the operation advances to the step 912.

Step 912: If there is any of the steps 401 to 805 being executed, all of them are interrupted. After this, the main memory watching address register 107 is caused to execute the counter operation, and the data of one block is transferred from the data array 102 to the main memory, thus eliminating the inconsistency of the stored contents. The update bit (i.e., the U bit) of said block is set to "0", and the operation advances to a step 913.

Step 913: In order to eliminate the access interruption to the main memory by another cache, the MWAIT-N signal 132 is negated (to have an electric level H: High). Simultaneously with this, the interrupted ones of the steps 401 to 805 are executed again to end the processing.

Step 914: In order to execute the invalidations having been explained at the step 906 or 907, the V bit of the hit portion of the address array of the cache is set to "0", thus ending the processing.

The present invention should not be limited to the embodiments thus far described but can naturally be modified in various manners within its technical concept.

For example, the present invention can be applied to a multiprocessor system which has three or more sets of processors and caches connected with the main memory bus.

If, moreover, an instruction cache and a data cache are arranged in the microprocessors 1001 and 1002, the instructions and the data accesses can be speeded up.

The cache (100:#1 or #2) can be accessed not only by the logical addresses generated by the CPU in the microprocessors 1001 and 1002 but also by the physical addresses which are translated from said logical addresses by an address translation unit (e.g., an address translation lookaside buffer) such as an MMU (Memory Management Unit).

Still moreover, the memory unit 1004 may be a shared cache which can be accessed by a plurality of microprocessors 1001 and 1002. In this system of hierarchical caches, the main memory is connected with a layer lower than the lower shared cache 1004.

According to the present invention, each cache need not contain an exceptional bit data indicating that the data of an identical copy is stored in a plurality of caches.

According to the present invention, at the time of the write hit of the cache upon the valid and non-updated block, the data transfer of the hit block from the main memory to the cache need not be executed.

According to the present invention, the exceptional bit data indicating whether or not the main memory should reply to the block miss need not be contained in the main memory.

According to the present invention, the number of cache states can be suppressed to the minimum necessary for the cache coherence in the multiprocessor, and the hardware for the control unit for controlling the states of the caches can be minimized.

According to the present invention, even if the numbers of the processors and caches are increased, the cache in the updated (or dirty) state will not continuously reply the request for the data transfer from other plural caches, and the cache at first in the updated (or dirty) state can promptly reply to the access request from the relevant processor.

What is claimed is:

1. A multiprocessor comprising:
   a first processor for generating a first address;
   a first cache memory adapted to be accessed in accordance with said first address from said first processor;
   a second processor for generating a second address;
   a second cache memory adapted to be accessed in accordance with said second address from said second processor;
   an address bus to which is transmitted said first address through said first cache memory and said second address through said second cache memory;
   a data bus connected to said first processor through said first cache memory and to said second processor through said second cache memory;
   an invalidating signal line connected to said first cache memory and said second cache memory; and
   memory means connected to said address bus and said data bus,
   wherein said first cache memory and said second cache memory store data and are operated by at least the copy-back method,
   wherein the data for said first cache memory exists in a one state selected from a group consisting of: a first state corresponding to an invalid state of pertinent data in said cache memory; a second state corresponding to a valid and non-updated state of the pertinent data in said cache memory; and a third state corresponding to a valid and updated state of the pertinent data in said cache memory,
   wherein the data of said second cache memory exists in a one state selected from said group,
   wherein when a write access from said first processor hits said first cache memory with a first write hit address, the state of the data of said first cache memory is shifted from said valid and non-updated second state to said valid and updated third state, and said first cache memory outputs said first write hit address and an invalidating signal to said address bus and said invalidating signal line effecting a shift of the state of the data of the first write hit address stored elsewhere than the first cache memory to the invalid first state,
   wherein, when a write access from said second processor hits said second cache memory with a second write hit address, the state of the data of said second cache memory is shifted from said valid and non-updated second state to said valid and updated third state, and said second cache memory outputs said second write hit address and an invalidating signal to said address bus and said invalidating signal line effecting a shift of the state of the data of the second write hit address stored elsewhere than the second cache memory to the invalid first state,
   wherein, when the write access from the first processor misses said first cache memory, said first cache memory outputs the address of said write miss to said address bus to block-read the data of one block from said memory means and outputs the invalidating signal to said invalidating signal line and then executes a write of data of said write miss to said first cache memory,
   wherein, when the write access from said second processor misses said second cache memory, said second cache memory outputs the address of said write miss to said address bus to block-read the data of one block from said memory means and outputs the invalidating signal to said invalidating signal line and then executes a write of data of said write miss to said second cache memory, and
   wherein, in case one of said first cache memory and said second cache memory hold data of the valid and updated third state relating to an address of access request when said address bus is fed with the address of access request for a read or a write, said cache includes means for writing back said data to said memory means from said one cache memory and shifting said data relating to said address from said third state to the valid and non-updated second state.

2. A multiprocessor system according to claim 1, wherein said memory means is a main memory.

3. The multiprocessor system according to claim 1, further comprising
   an input/output device connected with said address bus and said data bus,
   wherein when a one block composed of a plurality of words is transferred to said first cache memory from said memory means due to the miss of the access of said first processor to said first cache and wherein a one of said second cache and said input/output device requests an access of said address bus during a bus nonuse period between word-word transfers in connection with a block different from said one block, said first cache includes means for replying to the access request such that said first cache memory relinquishes bus ownership and said one of said second cache and said input/output device executes the requested access to said memory means through said address bus and said data bus, and
   means for then completing the remaining portion of the transfer to said first cache memory.

4. The multiprocessor system according to claim 3, wherein when said one of said second cache and said input/output device requests an access of said address bus during the word-word bus nonuse period of said transfer due to said miss in connection with a same block as said one block, said first cache includes means for replying to the access request of said one such that the first cache memory executes the remaining portion of said block transfer due to said miss and then relinquishes the access to said memory means through said address bus and said data bus.

5. The multiprocessor system according to claim 1, further comprising:
   an input/output device connected with said address bus and said data bus,
   wherein, if one of said first and second cache memories holds a data in a valid and updated third state corresponding to a written address and wherein said input/output device requests a write of data to said one of one block composed of a predetermined number of words in said memory means, said one of said cache memories includes means for responding to the write request such that the one cache memory omits a write of the data in said third state to said memory means.

6. A multiprocessor system according to claim 5, wherein said memory means is a main memory.

7. The multiprocessor system according to claim 5, wherein said one cache memory includes means for replying to said write request to said memory means to shift said data state of said one cache memory from said third state to an invalid first state.

8. A cache memory for use in a multiprocessor system including a first processor for generating an address, a second processor for generating an address, an address bus adapted to receive the address from said first processor and the address from said second processor transmitted thereto, a data bus for transferring data of said first processor and said second processor, and memory means connected with said address bus and said data bus, comprising:

a first cache memory adapted to be accessed in accordance with the address from said first processor and operated by at least the copy-back method; and a second cache memory adapted to be accessed in accordance with the address from said second processor and operated by at least the copy-back method, wherein a state of the data of said first cache memory exists in one state selected from a group consisting of: a first state corresponding to an invalid state of the pertinent data in said cache memory; a second state corresponding to a valid and non-updated state of the pertinent data in said cache memory; and a third state corresponding to a valid and updated state of the pertinent data in said cache memory, wherein a state of the data of said second cache memory exists in one state selected from said group, wherein said first cache memory and said second cache memory are connected through an invalidating signal line for communicating an invalidating signal to shift a state of data to the first invalid state, wherein a write access from said first processor hits said first cache memory with a first write hit address, the state of the data of said first cache memory is shifted from said valid and non-updated second state to said valid and updated third state, and said first cache memory outputs said first write hit address and the invalidating signal to said address bus and said invalidating signal line, wherein, when a write access from said second processor hits said second cache memory with a second write hit address, the state of the data of said second cache memory is shifted from said valid and non-updated second state to said valid and updated third state, and said second cache memory outputs said second write hit address and the invalidating signal to said address bus and said invalidating signal line, wherein, when the write access from said first processor misses said first cache memory with a first write miss address, said first cache memory outputs the address of write miss to said address bus to block-read the data of one block identified by the first write miss address from said memory means and outputs the invalidating signal to said invalidating signal line and then executes the write of the data relating to said first write miss address to said first cache memory, wherein, when the write access from said second processor misses said second cache memory with a second write miss address, said second cache memory outputs the address of said write miss to said address bus to block-read the data of one block identified by the second write miss address from said memory means and outputs the invalidating signal to said invalidating signal line and then executes the write of the data relating to said second write miss address to said second cache memory, and wherein, in case one of said first cache memory and said second cache memory hold data in the valid and updated third state relating to an address, when said address bus is fed with the address from an access request for a read or a write, said one cache includes means for writing back said data to said memory means from said one cache and shifting said data relating to said address from said third state to the valid and non-updated second state.

9. The cache memory according to claim 8, wherein said first and second caches include means for storing a copy of a portion of the data of said memory means which comprises a main memory in said multiprocessor system.

10. The cache memory according to claim 8, wherein said multiprocessor system further includes an input/output device connected with said address bus and said data bus, wherein, when a one block comprised of a plurality of words is transferred to said first cache memory from said memory means due to the miss of the access of said first processor to said first cache memory, and wherein a one of said second cache and said input/output device requests an access of said address bus during a bus nonuse period between word-word transfers in connection with a block different from said one block, said first cache includes means for replying to the request of access such that said first cache memory relinquishes bus control and one of said second cache and said input/output device completes the access to said memory means through said address bus, and means for then completing the remaining portion of said transfer to said first cache due to said miss.

11. The cache memory according to claim 10, wherein, when the one of said second cache and said input/output device requests an access of said address bus during the word-word bus nonuse period of said transfer due to said miss in connection with a same block as said one block, said first cache includes means for replying to the requested access of said one such that the first cache executes the remaining portion of said transfer due to said miss and then relinquishes the access to said memory means through said address bus and said data bus.

12. The cache memory according to claim 8, wherein said multiprocessor system further includes an input/output device connected with said address bus and said data bus, wherein, if one of said first and second caches holds data in the valid and updated third state corresponding to a written address and wherein said input/output device requests write of data to said one of one block composed of a predetermined number of words in said memory means, said one cache memory includes means for replying to said write request such that the one cache memory omits a write of the data in said third state in said memory means.

13. The cache memory according to claim 12, wherein said first and second caches include means for storing a portion of a copy of the data of said memory means which comprises a main memory in said multiprocessor system.

14. The cache memory according to claim 12, wherein said one cache memory includes means for replying to said write request to said memory means to shift said data state of said one cache memory from said third state to an invalid first state.

* * * * *